United States Patent
Fang et al.

(10) Patent No.: US 11,463,700 B2
(45) Date of Patent: Oct. 4, 2022

(54) VIDEO PICTURE PROCESSING METHOD AND APPARATUS

(71) Applicant: HUAWEI TECHNOLOGIES CO., LTD., Shenzhen (CN)

(72) Inventors: Huameng Fang, Shenzhen (CN); Peiyun Di, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 341 days.

(21) Appl. No.: 16/880,757

(22) Filed: May 21, 2020

(65) Prior Publication Data

US 2020/0288136 A1 Sep. 10, 2020

Related U.S. Application Data

(63) Continuation of application No. PCT/CN2018/123438, filed on Dec. 25, 2018.

(30) Foreign Application Priority Data

Jan. 3, 2018 (CN) .......................... 201810005816.1

(51) Int. Cl.
*H04N 19/132* (2014.01)
*H04N 19/117* (2014.01)
(Continued)

(52) U.S. Cl.
CPC ............ *H04N 19/132* (2014.11); *G06T 3/40* (2013.01); *G06T 7/40* (2013.01); *G06T 9/00* (2013.01);
(Continued)

(58) Field of Classification Search
CPC .. H04N 19/132; H04N 19/117; H04N 19/119; H04N 19/176; G06T 3/40; G06T 7/40; G06T 9/00
(Continued)

(56) References Cited

U.S. PATENT DOCUMENTS

| 6,043,837 A * | 3/2000 | Driscoll, Jr. ........... H04N 7/185 725/91 |
| 8,989,493 B1 * | 3/2015 | Huang ................... G06T 5/001 382/173 |

(Continued)

FOREIGN PATENT DOCUMENTS

| CN | 1725860 A | 1/2006 |
| CN | 102117008 A | 7/2011 |

(Continued)

OTHER PUBLICATIONS

ISO/IEC 14496-12 Fifth edition, Information technology—Coding of audiovisual objects—Part 12: ISO base media file format, Dec. 15, 2015, total 248 pages.

(Continued)

*Primary Examiner* — Dominic D Saltarelli
(74) *Attorney, Agent, or Firm* — Stein IP, LLC

(57) ABSTRACT

A video picture processing method includes: sampling an initial picture, to obtain a target picture; dividing the target picture, to obtain a plurality of sub-pictures; extending picture borders of a first-category sub-picture, to obtain an extended first-category sub-picture; downsampling the extended first-category sub-picture, to obtain a downsampled first-category sub-picture; encoding a second-category sub-picture and the downsampled first-category sub-picture, to obtain bitstreams; and writing location information and extension information of the plurality of sub-pictures into the bitstreams, where extension information of the first-category sub-picture is used to indicate that the picture borders of the first-category sub-picture have been extended and indicate extension widths of the picture borders, and extension information of the second-category sub-picture is used to indicate that picture borders of the second-category sub-picture have not been extended.

14 Claims, 14 Drawing Sheets

(51) Int. Cl.
*H04N 19/119* (2014.01)
*H04N 19/176* (2014.01)
*G06T 3/40* (2006.01)
*G06T 7/40* (2017.01)
*G06T 9/00* (2006.01)

(52) U.S. Cl.
CPC ......... *H04N 19/117* (2014.11); *H04N 19/119* (2014.11); *H04N 19/176* (2014.11)

(58) Field of Classification Search
USPC ........................................................ 382/232
See application file for complete search history.

(56) References Cited

U.S. PATENT DOCUMENTS

| | | | |
|---|---|---|---|
| 2014/0301649 A1* | 10/2014 | Zhang | G06T 7/0002 382/199 |
| 2015/0193909 A1* | 7/2015 | Maayan | H04N 5/23238 345/648 |
| 2017/0094269 A1 | 3/2017 | Ye et al. | |
| 2018/0205934 A1* | 7/2018 | Abbas | H04N 7/015 |
| 2019/0199995 A1* | 6/2019 | Yip | G06T 3/00 |
| 2019/0349598 A1* | 11/2019 | Aminlou | H04N 19/105 |

FOREIGN PATENT DOCUMENTS

| | | |
|---|---|---|
| CN | 103168315 A | 6/2013 |
| CN | 104618648 A | 5/2015 |
| CN | 105869113 A | 8/2016 |
| CN | 106254874 A | 12/2016 |
| CN | 107517385 A | 12/2017 |
| WO | 2013136403 A1 | 9/2013 |
| WO | 2017158236 A2 | 9/2017 |
| WO | 2017215587 A1 | 12/2017 |

OTHER PUBLICATIONS

Byeongdoo Choi:"WD on ISO/IEC 23000-20 Omnidirectional Media Application Format",ISO/IEC JTC1/SC29/WG11 N16189, ISO/IEC WD 23000-20:2016, Jul. 2016. total 40 pages.

Byeongdoo Choi et al.:"Study of ISO/IEC DIS 23000-20 Omnidirectional Media Format", ISO/IEC JTC1/SC29/WG11 N16950, Jul. 2017, Torino, Italy. Total 114 pages.

ITU-T H.265(Dec. 2016), Series H: Audiovisual and Multimedia Systems, Infrastructure of audiovisual services Coding of moving video, High efficiency video coding, Dec. 2016. total 664 pages.

Hyun Mook Oh et al: "Region-wise quality indication SEI message", Joint Collaborative Team on Video Coding of ISO/IEC JTC1/SC29/ WG11 and ITU-T SG.16, JCTVC-AA0030, 27th Meeting: Hobart, AU, Mar. 31-Apr. 7, 2017, XP030118197, total 4 pages.

Yago Sanchez et al: "[OMAF] On Region-Wise Quality Ranking", 120. MPEG Meeting; Macau; (Motion Picture Expert Group or ISO/IEC JTC1/SC29/WG11), No. m41620, Jul. 2017, XP030069962, total 5 pages.

Byeongdoo Choi et al: "OMAF DIS text with updates based on Berlin OMAF AHG meeting agreements", Motion Picture Expert Group or ISO/IEC JTC1/SC29/WG11), No. m40849, Jul. 2017, XP030069193, total 70 pages.

Yuqun Fan et al: "[OMAF] Reconstructing bitstream from sub-picture bitstreams and motion constraint information signaling", (Motion Picture Expert Group or ISO/IEC JTC1/SC29/WG11), No. m41465, Oct. 2017, XP030069808, total 4 pages.

"Dimitri Podborski et al: ""Text and test vectors for a viewport-dependent profile with tile streaming"", Motion Picture Expert Group or ISO/IEC JTC1/SC29/WG11), No. m40803, Jun. 2017, XP030069147, total 15 pages."

* cited by examiner

VIDEO PICTURE PROCESSING METHOD AND APPARATUS

CROSS-REFERENCE TO RELATED APPLICATIONS

This application is a continuation of International Application No. PCT/CN2018/123438, filed on Dec. 25, 2018, which claims priority to Chinese Patent Application No. 201810005816.1, filed on Jan. 3, 2018. The disclosures of the aforementioned applications are hereby incorporated by reference in their entireties.

TECHNICAL FIELD

Aspects of this application relate to the field of video encoding and decoding technologies, and more specifically, to a video picture processing method and apparatus.

BACKGROUND

A panoramic video picture (360-degree video picture) is an omnidirectional 3D view that is of a photographed object and that is captured by using a camera, and emergence of the panoramic video picture brings better visual experience to people. As shown in FIG. 1, a panoramic video picture may be virtualized into a spherical video picture. Usually, a user watches a spherical video picture of one visual angle at a moment. For example, the user watches a video picture of a visual angle 1 or a visual angle 2 in FIG. 1 at a moment.

Because a user watches a spherical video picture of a visual angle at each moment, in a video encoding and decoding transmission system (the system mainly includes a server and a terminal), to save a transmission bandwidth, a visual angle-based bitstream transmission solution is generally used. Specifically, the visual angle-based bitstream transmission solution mainly includes the following process:

dividing, by a server, a to-be-encoded video picture into a plurality of sub-pictures, to obtain the plurality of sub-pictures;

independently encoding, by the server, each sub-picture, to obtain a bitstream of the sub-picture;

obtaining, by a terminal, information about a visual angle at which a user watches a video at a current moment;

requesting, by the terminal from the server based on the information about the visual angle of the user, a bitstream of at least one sub-picture corresponding to the current watching visual angle of the user;

parsing, by the terminal, the bitstream of the at least one sub-picture, to obtain the at least one sub-picture; and splicing, by the terminal, the at least one sub-picture, to obtain a to-be-displayed picture.

Because the sub-pictures are independent of each other in an encoding process, distribution characteristics of quantization errors when the sub-pictures are encoded are also independent of each other. Therefore, when the at least one sub-picture is spliced, an obvious border may be generated at a boundary between different sub-pictures, affecting visual experience of the user.

Therefore, how to better eliminate a border generated when sub-pictures are spliced is a problem needing to be resolved.

SUMMARY

Aspects of this application provide a video picture processing method and apparatus, to better eliminate a border generated when sub-pictures are spliced.

According to a first aspect, a video picture processing method is provided. The method includes: sampling an initial picture, to obtain a target picture; dividing the target picture, to obtain a plurality of sub-pictures, where the plurality of sub-pictures include a first-category sub-picture and a second-category sub-picture, the first-category sub-picture is obtained by sampling a picture in a first region of the initial picture, the second-category sub-picture is obtained by sampling a picture in a second region of the initial picture, a sampling rate of the picture in the first region of the initial picture is lower than a sampling rate of the picture in the second region of the initial picture, and resolution of the first-category sub-picture is higher than resolution of the second-category sub-picture; extending picture borders of the first-category sub-picture, to obtain an extended first-category sub-picture; downsampling the extended first-category sub-picture, to obtain a downsampled first-category sub-picture, where resolution of the downsampled first-category sub-picture is the same as the resolution of the second-category sub-picture; encoding the second-category sub-picture and the downsampled first-category sub-picture, to obtain bitstreams; and writing location information and extension information of the plurality of sub-pictures into the bitstreams, where location information is used to indicate a location of a sub-picture in the target picture, extension information of the first-category sub-picture is used to indicate that the picture borders of the first-category sub-picture have been extended and indicate extension widths of the picture borders of the first-category sub-picture, and extension information of the second-category sub-picture is used to indicate that picture borders of the second-category sub-picture have not been extended.

In this application, only picture borders of a sub-picture (the first-category sub-picture) obtained at a low sampling rate are extended, and picture borders of a sub-picture (the second-category sub-picture) obtained at a high sampling rate are not extended, so that after picture splicing, a decoder side can perform weighted processing only on an overlapping region between sub-pictures obtained at a low sampling rate, and perform filtering processing on a border region between sub-pictures obtained at a high sampling rate and a border region between a sub-picture obtained at a high sampling rate and a sub-picture obtained at a low sampling rate. Therefore, after picture splicing, the decoder side processes overlapping and border regions between different sub-pictures in different manners based on different types of the sub-pictures, thereby better eliminating a picture border generated when sub-pictures are spliced.

Further, in this application, because border extension is performed only on some sub-pictures, but not on all sub-pictures, a bit rate is not greatly increased in this application.

With reference to the first aspect, in some implementations of the first aspect, the writing location information and extension information of the plurality of sub-pictures into the bitstreams includes: encapsulating location information and extension information of each of the plurality of sub-pictures into a same box.

Optionally, the box may alternatively be referred to as an "atom" in some specifications.

During encoding, location information and extension information of a sub-picture are encapsulated into a same box, so that a quantity of syntactic elements can be reduced, thereby reducing a transmission bit rate.

Optionally, the writing location information and extension information of the plurality of sub-pictures into the bitstreams includes: encapsulating the location information and the extension information of the plurality of sub-pictures into supplemental enhancement information (SEI) or a media presentation description (MPD).

The SEI may alternatively be referred to as a supplemental enhancement message, and the SEI is a type of a network abstract layer unit (NALU) defined in video encoding and decoding standards h.264 and h.265 released by the international telecommunication union (ITU). The SEI may be used to assist in decoding, displaying, and the like.

During encoding, location information and extension information of a sub-picture may be added to the SEI, and during decoding, the decoder side may obtain location information and extension information of a corresponding sub-picture by parsing the SEI. It should be understood that one piece of SEI may carry location information and extension information of only one sub-picture, or may carry location information and extension information of a plurality of sub-pictures.

The MPD is a document specified in the standard ISO/IEC 23009-1, and the document includes metadata used by a client to construct a hypertext transfer protocol-uniform resource locator (HTTP-URL). The MPD includes one or more period elements, each period element includes one or more adaptation sets, each adaptation set includes one or more representations, and each representation includes one or more segments. The client may select a representation based on information in the MPD, and construct an HTTP-URL of a segment.

During encoding, the location information and the extension information of the plurality of sub-pictures may be added to the MPD. During decoding, the decoder side may obtain the location information and the extension information of each sub-picture by parsing the MPD.

Optionally, the MPD may indicate, based on whether a field EssentialProperty includes an attribute regblk, whether different processing should be performed on different types of sub-pictures during decoding.

Specifically, when the field EssentialProperty includes the attribute regblk, the decoder side is instructed to perform weighted processing on an overlapping region between sub-pictures on which border extension has been performed, to eliminate a border, and filter a border region between a sub-picture on which border extension has been performed and a sub-picture on which border extension has not been performed, and filter a border region between sub-pictures on which border extension has not been performed, to eliminate borders. When the field EssentialProperty does not include the attribute regblk, the decoder side is instructed to process, in a uniform manner, a border generated when sub-pictures are spliced.

With reference to the first aspect, in some implementations of the first aspect, the initial picture is a panoramic video picture.

It should be further understood that the initial picture may alternatively be a spherical picture, a spherical video picture, or a three-dimensional picture.

The target picture may be a two-dimensional picture in a longitude and latitude map format or a two-dimensional picture in a polyhedron format. The two-dimensional picture in the polyhedron format includes a two-dimensional picture in a format such as a tetrahedron, a hexahedron, or an octahedron.

The two-dimensional picture herein may alternatively be referred to as a planar picture.

Specifically, when the initial picture is a spherical picture, and the target picture is a two-dimensional picture in a longitude and latitude map format, the target picture may be obtained by sampling the spherical picture. In a process of sampling the spherical picture, sampling rates of pictures in polar parts are lower, the first-category sub-picture may be obtained by sampling the pictures in the polar parts, a sampling rate of a picture in an equator part is higher, and the second-category sub-picture may be obtained by sampling the picture in the equator part.

According to a second aspect, a video picture processing method is provided. The method includes: obtaining target bitstreams; parsing the target bitstreams, to obtain a plurality of sub-pictures and location information and extension information of the plurality of sub-pictures, where location information is used to indicate a location of a sub-picture in a to-be-displayed picture, extension information is used to indicate whether picture borders of a sub-picture have been extended, and when the extension information indicates that picture borders of a sub-picture have been extended, the sub-picture belongs to a first-category sub-picture, and the extension information is further used to indicate extension widths of the picture borders of the sub-picture, or when the extension information indicates that picture borders of a sub-picture have not been extended, the sub-picture belongs to a second-category sub-picture; determining the first-category sub-picture and the second-category sub-picture from the plurality of sub-pictures based on the extension information of the plurality of sub-pictures; determining target resolution based on location information and extension information of the first-category sub-picture; upsampling the first-category sub-picture based on the target resolution, to obtain an upsampled first-category sub-picture, where resolution of the upsampled first-category sub-picture is the target resolution; splicing the upsampled first-category sub-picture and the second-category sub-picture based on the location information of the plurality of sub-pictures; performing weighted processing on values of pixels in an overlapping region between upsampled first-category sub-pictures, to obtain weighted first-category sub-pictures; and filtering a border region between adjacent second-category sub-pictures and a border region between a weighted first-category sub-picture and a second-category sub-picture, to obtain the to-be-displayed picture, where the border region includes regions of a preset size on two sides of a boundary between two sub-pictures In this application, after the plurality of sub-pictures are spliced, overlapping and border regions between different sub-pictures can be separately processed in different manners based on whether picture borders of the sub-pictures have been extended, thereby better eliminating a picture border generated when sub-pictures are spliced.

Further, in this application, because border extension is performed only on some sub-pictures, but not on all sub-pictures, a bit rate is not greatly increased in this application.

With reference to the second aspect, in some implementations of the second aspect, the determining target resolution based on location information and extension information of the first-category sub-picture includes: determining a width and a height of the first-category sub-picture based on the location information of the first-category sub-picture; determining, based on the extension information of the first-category sub-picture, extension widths of picture borders of the first-category sub-picture; and determining the target resolution based on the width and the height of the first-category sub-picture and the extension widths of the picture borders of the first-category sub-picture.

Optionally, the determining the target resolution based on the width and the height of the first-category sub-picture and the extension widths of the picture borders of the first-category sub-picture includes: extending the width and the height of the first-category sub-picture based on the extension widths of the picture borders of the first-category sub-picture, to obtain an extended target width and an extended target height; and determining a product of the target width and the target height as the target resolution.

It should be understood that all of a width and a height of a sub-picture and extension widths of picture borders may be represented by using quantities of pixels. For example, the width and the height of the first-category sub-picture are respectively 1280 and 480, both extension widths of a left border and a right border of the first-category sub-picture are 96, and both extension widths of a top border and a bottom border of the first-category sub-picture are 0. Then, the extended target width is 1472, and the extended target height is 480. Therefore, the target resolution is 1472×480.

With reference to the second aspect, in some implementations of the second aspect, location information and extension information of each of the plurality of sub-pictures are encapsulated into a same box.

Location information and extension information of a sub-picture are encapsulated into a same box, so that a quantity of syntactic elements can be reduced, thereby reducing a transmission bit rate.

With reference to the second aspect, in some implementations of the second aspect, the location information and the extension information of the plurality of sub-pictures are encapsulated into supplemental enhancement information SEI or a media presentation description MPD.

With reference to the second aspect, in some implementations of the second aspect, the overlapping region between the upsampled first-category sub-pictures includes an overlapping region between a first sub-picture and a second sub-picture, a picture that is in the overlapping region and that is of the first sub-picture is an extended picture, and a picture that is in the overlapping region and that is of the second sub-picture is an overlapping picture; and the performing weighted processing on values of pixels in an overlapping region between upsampled first-category sub-pictures includes: performing weighted processing on values of pixels that are in the extended picture and the overlapping picture and that are at a same location in the overlapping region, where a pixel that is in the overlapping picture and that is closer to a center location of the first sub-picture has a greater weighting coefficient, and a pixel that is in the extended picture and that is closer to the center location of the first sub-picture has a smaller weighting coefficient.

When weighted processing is performed on the overlapping region, a weighting coefficient is properly set, thereby improving an effect of weighted processing, and better eliminating a border generated when sub-pictures are spliced.

Optionally, weighted processing may change linearly or nonlinearly.

In addition, a weighting coefficient of a pixel that is in the overlapping picture and that is farthest from the center location of the first sub-picture is 0, and a weighting coefficient of a pixel that is in the overlapping picture and that is closest to the center location of the first sub-picture is 1. A weighting coefficient of a pixel that is in the extended picture and that is closest to the center location of the first sub-picture is 0, and a weighting coefficient of a pixel that is in the extended picture and that is farthest from the center location of the first sub-picture is 1.

With reference to the second aspect, in some implementations of the second aspect, the filtering a border region between adjacent second-category sub-pictures and a border region between a weighted first-category sub-picture and a second-category sub-picture, to obtain the to-be-displayed picture includes: determining pixel value gradients of pictures in the border region; and when a pixel value gradient of a picture in the border region is less than a preset gradient, performing filtering processing on the picture in the border region; or when a pixel value gradient of a picture in the border region is greater than or equal to the preset gradient, omitting filtering processing on the picture in the border region.

When a value of a pixel value gradient of a picture in a border region is larger, human eyes are insensitive to a border generated in the border region. In this case, filtering processing on the picture in the border region may be omitted. When a value of a pixel value gradient of a picture in a border region is smaller, human eyes are more sensitive to a border generated in the border region. In this case, to achieve a relatively good display effect, filtering processing should be performed on the picture in the border region. Therefore, in aspects of this application, it can be properly determined, based on sensitivity of human eyes to different pixel value gradients, whether filtering processing should be performed on a picture in a border region, and a relatively good processing manner can be selected after comprehensive consideration of a display effect and a picture processing effect.

With reference to the second aspect, in some implementations of the second aspect, the border region includes a first region and a second region, and the performing filtering processing on the picture in the border region includes: determining a texture strength of the border region; when the texture strength of the border region is greater than or equal to a first preset strength, performing filtering processing on the border region by using a first filtering strength; or determining a texture strength of a target region when the texture strength of the border region is less than the first preset strength, where the target region is the first region or the second region; and when the texture strength of the target region is greater than or equal to a second preset strength, filtering a picture in the target region by using the first filtering strength; or when the texture strength of the target region is less than the second preset strength, filtering the picture in the target region by using a second filtering strength.

When the texture strength of the border region is less than the first preset strength, it may be considered that the texture strength of the border region is weaker. Because human eyes are more sensitive to a picture region with a weaker texture strength, texture strengths of target regions on two sides of a boundary in the border region should be further determined. When a texture strength of a target region is greater than or equal to the second preset strength, it may be considered that the texture strength of the target region is stronger. In this case, only weak filtering should be performed on the target region. When a texture strength of a target region is less than the second preset strength, it may be considered that the texture strength of the target region is weaker. In this case, only strong filtering should be performed on the target region.

With reference to the second aspect, in some implementations of the second aspect, an effect range of the first filtering strength is less than an effect range of the second filtering strength.

According to a third aspect, a video picture processing apparatus is provided. The apparatus includes modules configured to perform the method in the first aspect or the implementations of the first aspect.

According to a fourth aspect, a video picture processing apparatus is provided. The apparatus includes modules configured to perform the method in the second aspect or the implementations of the second aspect.

According to a fifth aspect, a terminal device is provided. The terminal device includes: a memory, configured to store a program; and a processor, configured to execute the program stored in the memory, where when the program is executed, the processor is configured to perform the method in the first aspect or the implementations of the first aspect.

According to a sixth aspect, a terminal device is provided. The terminal device includes: a memory, configured to store a program; and a processor, configured to execute the program stored in the memory, where when the program is executed, the processor is configured to perform the method in the second aspect or the implementations of the second aspect.

According to a seventh aspect, a computer-readable medium is provided. The computer-readable medium stores program code to be executed by a device, and the program code includes an instruction used to perform the method in the first aspect or the implementations of the first aspect.

According to an eighth aspect, a computer-readable medium is provided. The computer-readable medium stores program code to be executed by a device, and the program code includes an instruction used to perform the method in the second aspect or the implementations of the second aspect.

DESCRIPTION OF EMBODIMENTS

Figure 1:
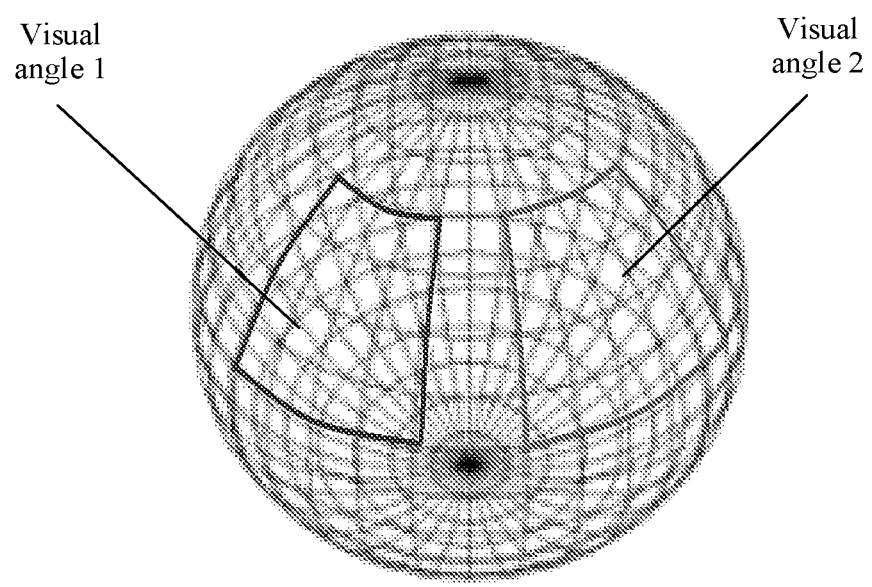
FIG. 1 is a schematic diagram of a spherical video picture.

The following describes technical solutions in this application with reference to the accompanying drawings.

To better understand a video picture processing method in the embodiments of this application, the following first briefly describes some basic content of video encoding and decoding.

A video usually includes many frames of pictures in a specific sequence. Usually, massive amounts of repeated information (redundant information) exists in one frame of picture or between different frames of pictures. For example, one frame of picture usually includes a large quantity of parts that have a same spatial structure or similar spatial structures. In other words, a video file includes a large amount of spatially redundant information. In addition, the video file also includes a large amount of temporally redundant information. This is caused by a composition structure of a video. For example, a frame rate of video sampling is usually 25 frames/second to 60 frames/second. To be specific, a sampling time interval between two adjacent frames is within a range from $\frac{1}{60}$ seconds to $\frac{1}{25}$ seconds. In such a short time, a large amount of similar information almost exists in all pictures obtained through sampling, and the pictures are closely associated.

In addition, related researches show that a part that can be compressed, that is, visual redundancy, also exists in video information from a perspective of a psychological feature: visual sensitivity of human eyes. The visual redundancy means that a video bitstream is properly compressed by using a feature that human eyes are more sensitive to a luminance change but less sensitive to a chrominance change. For example, in a high-brightness region, sensitivity of human eye vision to a luminance change tends to decrease, and the human eye vision is more sensitive to an edge of an object. In addition, human eyes are less sensitive to an internal region but more sensitive to an overall structure. Because a video picture is used to finally provide services for the human group, compression processing may be performed on an original video picture by fully using such features of human eyes, to achieve a better compression effect. In addition to the above-mentioned space redundancy, time redundancy, and visual redundancy, a series of redundant information such as information entropy redundancy, structural redundancy, knowledge redundancy, and importance redundancy may further exist in video picture information. An objective of video encoding (which may also be referred to as video compression coding) is to remove redundant information from a video sequence by using various technical methods, to reduce storage space and save transmission bandwidth.

Currently, in an international universal range, there are four mainstream compression coding manners in video compression coding standards: chrominance sampling, predictive coding, transform coding, and quantization coding. The following separately describes in detail these coding manners.

Chrominance sampling: In this manner, visual psychological features of human eyes are fully used, to attempt to maximally reduce a data volume described by a single element starting from an underlying data representation. For example, luminance-chrominance-chrominance (YUV) color coding is used in most television systems, and this is a standard widely used in European television systems. YUV color space includes one luminance signal Y and two color difference signals U and V. The three components are independent of each other. Compared with a conventional red-green-blue (RGB) color mode, the YUV color space has more advantages. A separation representation manner is more flexible, and lower bandwidth is occupied for transmission. For example, a form of YUV 4:2:0 indicates that the two chrominance components U and V are only a half of the luminance component Y in both a horizontal direction and a vertical direction. In other words, four sampling pixels include four luminance components Y, only one chrominance component U, and only one chrominance component V. When such a representation form is used, the data volume is further reduced and only accounts for approximately 33% of an original data volume. Therefore, chrominance sampling fully uses physiological visual features of human eyes, to implementing video compression in such a chrominance sampling manner, and is one of video data compression manners widely used at present.

Predictive coding: During predictive coding, a currently-to-be-encoded frame is predicted by using data information of a previously encoded frame. A predictor is obtained through prediction and is not exactly equal to an actual value. A residual value exists between the predictor and the actual value. More accurate prediction indicates the predictor closer to the actual value and a smaller residual value. In this way, a data volume can be greatly reduced by encoding the residual value. A matching picture is restored or and reconstructed by adding the residual value to the predictor during decoding on a decoder side. This is a basic idea and method of predictive coding. In mainstream coding standards, predictive coding is classified into two basic types: intra prediction and inter prediction. The intra prediction means that a pixel value of a pixel in a current coding unit is predicted by using a pixel value of a pixel in a reconstructed region of a current picture. The inter prediction means that in a reconstructed picture, a matching reference block for a current coding unit in a current picture is searched for, a pixel value of a pixel in the reference block is used as predicted information or a predictor of a pixel value of a pixel in the current coding unit, and motion information of the current coding unit is transmitted.

Transform coding: In this coding manner, original space domain information is not directly encoded. Instead, a sampled value of the information is transformed from a current domain into another artificially defined domain (usually referred to as a transform domain) by using a transform function in a particular form, and then compression coding is performed based on a distribution feature of the information in the transform domain. Because a data correlation of video picture data is usually very high in a space domain and a large amount of redundant information exists, if encoding is directly performed, a large quantity of bits are needed. In contrast, after the sampled value of the information is transformed into the transform domain, the data correlation is greatly lowered. In this case, during encoding, because redundant information is reduced, a data volume required for the encoding is greatly reduced accordingly. In this way, a relatively high compression ratio can be obtained, and a relatively good compression effect can be achieved. Typical transform coding manners include Karhunen-Loeve (K-L) transform, Fourier transform, and the like.

Quantization coding: Data is actually not compressed during the above-mentioned transform coding, but can be effectively compressed in a quantization process. The quantization process is a main reason for a data "loss" in lossy compression. The quantization process is a process in which "forcible planning" is performed, so that an input value with a relatively large dynamic range is replaced with a relatively small quantity of output values. A quantization input value has a relatively large range, and therefore should be represented by using a relatively large quantity of bits. In contrast, an output value obtained after the "forcible planning" has a relatively small range, and therefore should be represented by using only a small quantity of bits.

In a coding algorithm based on a hybrid coding architecture, the foregoing several compression coding manners may be used in combination. An encoder control module selects, based on local features of different image blocks in a video frame, encoding modes used for the image blocks. Frequency domain or space domain prediction is performed on a block on which intra predictive coding is performed, and motion compensation prediction is performed on a block on which inter predictive coding is performed. Then, transform and quantization processing are performed on a predicted residual to form a residual coefficient. At last, a final bitstream is generated by using an entropy encoder. To avoid accumulation of prediction errors, an intra prediction reference signal or inter prediction reference signal is obtained by using a decoding module on an encoder side. Inverse quantization and inverse transform are performed on the residual coefficient obtained through the transform and quantization, to reconstruct a residual signal, and then the residual signal is added to a predicted reference signal, to obtain a reconstructed picture. In addition, pixel correction is performed on the reconstructed picture through loop filtering, to improve encoding quality of the reconstructed picture.

Figure 2:
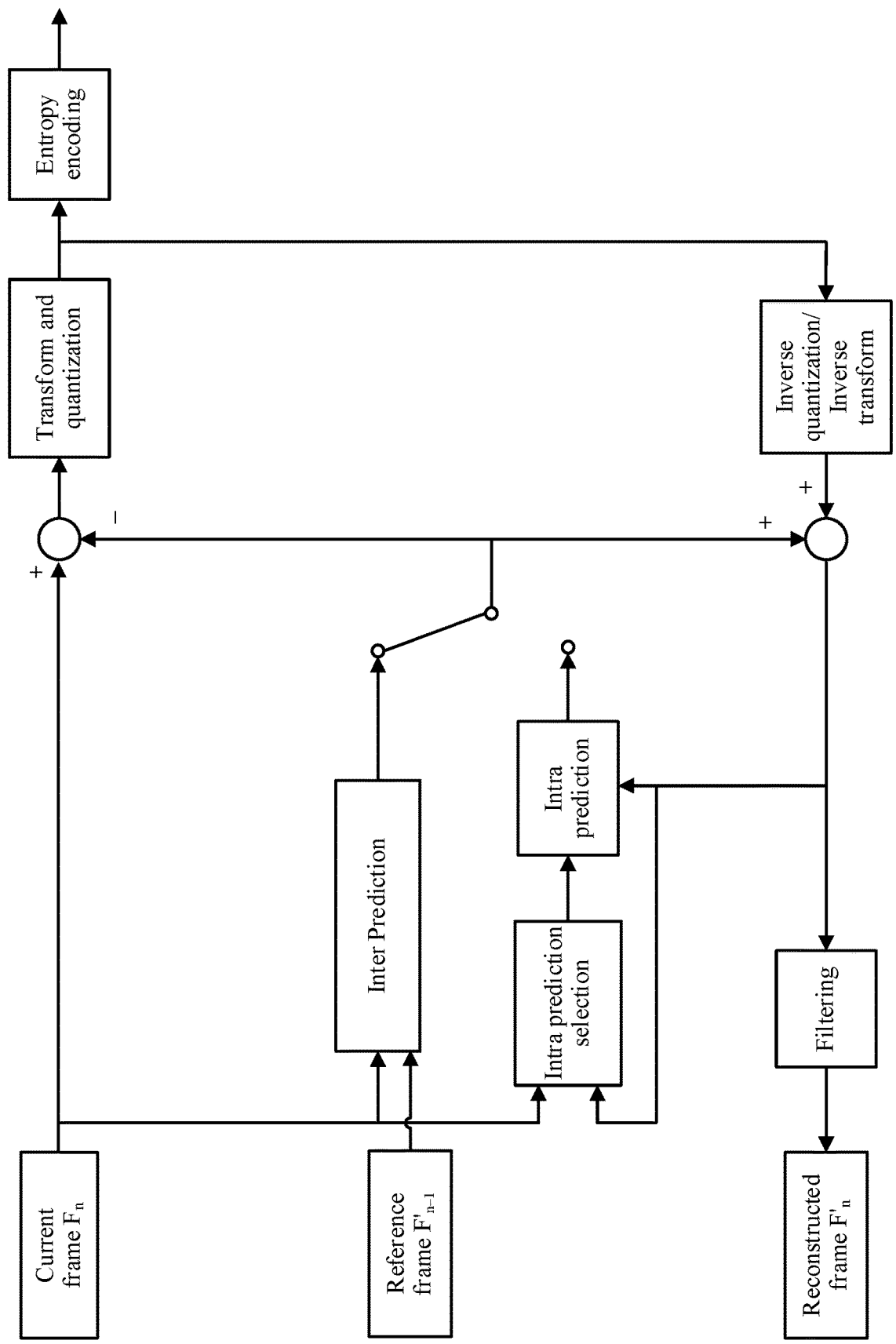
FIG. 2 is a schematic flowchart of a video encoding process.
Figure 3:
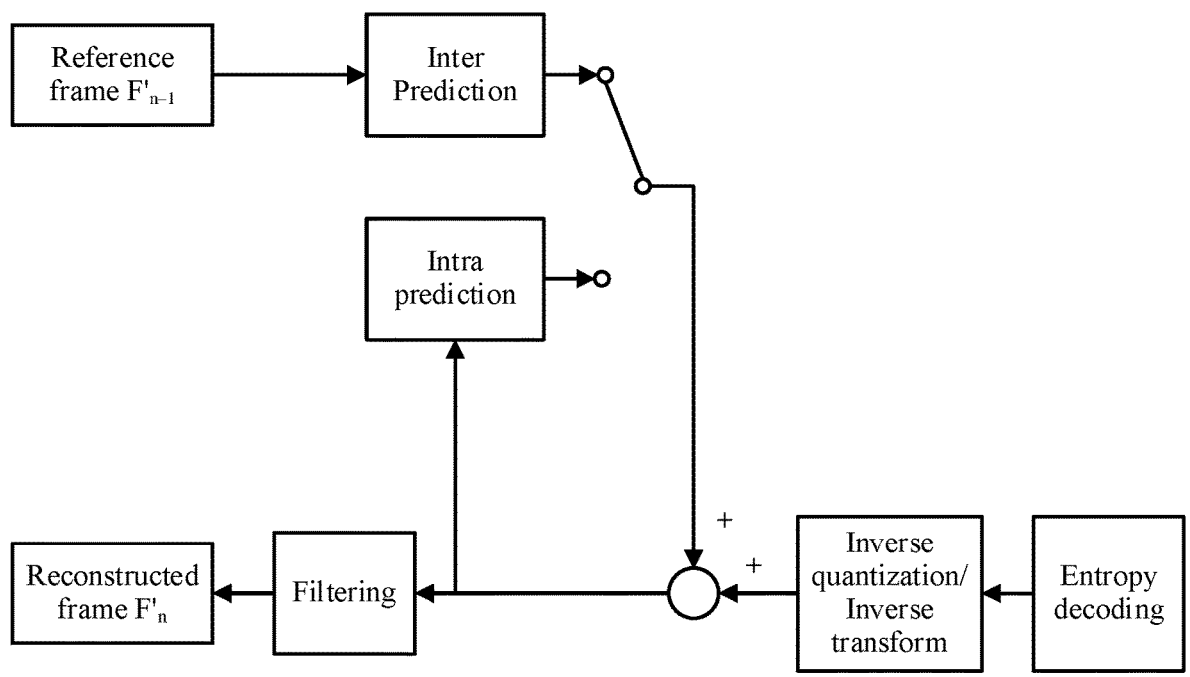
FIG. 3 is a schematic flowchart of a video decoding process.

The following briefly describes an entire video encoding and decoding process with reference to FIG. 2 and FIG. 3.

FIG. 2 is a schematic diagram of a video encoding process.

As shown in FIG. 2, a current image block in a current frame $F_n$ may be predicted through intra prediction or inter prediction. Specifically, it may be determined, based on a type of the current frame $F_n$ whether to select intra encoding or inter encoding. For example, when the current frame $F_n$ is an I frame, intra prediction is used, or when the current frame $F_n$ is a P frame or a B frame, inter prediction is used. When intra prediction is used, a pixel value of a pixel in the current image block may be predicted by using a pixel value of a pixel in a reconstructed region of the current frame $F_n$. When inter prediction is used, a pixel value of a pixel in the current image block may be predicted by using a pixel value of a pixel in a reference block that is in a reference frame $F'_{n-1}$ and that matches the current image block.

After a to-be-predicted block of the current image block is obtained through inter prediction or intra prediction, a difference between the pixel value of the pixel in the current image block and a pixel value of a pixel in the to-be-predicted block is calculated, to obtain residual information, and transform, quantization, and entropy encoding are performed on the residual information, to obtain an encoded bitstream. In addition, in an encoding process, superposition also should be performed on the residual information of the current frame $F_n$ and the predicted information of the current frame $F_n$, and a filtering operation is performed, to obtain a reconstructed frame F'$_n$ of the current frame and use the reconstructed frame F'$_n$ as a reference frame of subsequent encoding.

FIG. 3 is a schematic diagram of a video decoding process.

The video decoding process shown in FIG. 3 is an inverse process of a video encoding process shown in FIG. 2. During decoding, residual information is obtained through entropy decoding, inverse quantization, and inverse transform, and whether intra prediction or inter prediction is performed on a current image block is determined based on a decoded bitstream. In case of intra prediction, predicted information is constructed by using a pixel value of a pixel in a reconstructed region of a current frame and according to an intra prediction method. If case of inter prediction, motion information should be parsed out, a reference block is determined in a reconstructed picture by using the motion information that is parsed out, a pixel value of a pixel in the reference block is used as predicted information, superposition is performed on the predicted information and the residual information on the predicted information and the residual information, and a filtering operation is performed to obtain reconstructed information.

The following briefly describes a basic concept of inter prediction/inter coding.

Inter prediction/inter coding (motion prediction/compensation) is an important video compression technology, and is used to remove time domain redundancy in video information. Because a video sequence usually includes a quite strong time domain correlation, not all information about each picture is needed, and only motion information and motion compensation information in a current picture (current frame) should be transmitted to a decoder side. Inter prediction means that an encoded picture is used as a reference picture (reference frame) of a current frame, a matching reference block for a current coding block in the current picture is searched for, a pixel value of a pixel in the reference block is used as predicted information or a predictor of a pixel value of a pixel in the current coding block, and motion information of each block is obtained. The motion information usually includes indication information of a picture in which the reference block is located, that is, reference frame information, and information about a shift from the reference block to a current coding block, that is, a motion vector (MV).

In addition, in the video encoding and decoding process, a relatively large proportion of a compressed bitstream is used for transmitting motion information. In a case of a low bit rate, especially for a high-definition video, a quantity of bits used to indicate motion information usually exceed 50% of a total bitstream. Efficient coding on motion information is an important means to improve coding efficiency. In a video, blocks at adjacent locations may belong to a same object or in a same motion scenario and have similar motion. Therefore, a quantity of bits occupied for motion information can be reduced by using a motion vector correlation between of adjacent blocks in space domain and time domain.

In encoding and decoding standards, motion information of an adjacent locations is usually used to predict motion information of a current location. Differential coding is performed on an MV in the motion information. The MV is divided into two parts: an MV predictor and a motion vector difference (MVD). The MV predictor is not encoded or not directly encoded, and is derived by using adjacent motion vectors in time domain and space domain. MVD information is encoded and then transmitted in a bitstream. In the decoding process, the MVD is extracted from the bitstream to derive the MV predictor, and the MV predictor is added to the MVD, to obtain the final MV. When the derived MV predictor approximates to the final MV to a greater extent, the MVD that should be transmitted is smaller. Therefore, optimization of an MV predictor derivation method can effectively reduce a quantity of bits occupied for motion information, and is crucial for efficient coding.

In addition, in this application, variable motion vector precision may alternatively be used during inter prediction. The following briefly describes meanings of the variable motion vector precision.

In an actual scenario, an object motion distance is unnecessarily an integer multiple of a pixel size. If only motion prediction/compensation with integer pixel precision is used, an inaccurate matching case occurs, resulting in a relatively large motion compensation residual. In view of this, to improve motion prediction/compensation precision, motion prediction/compensation with sub-pixel precision is used. Because there is no pixel at a sub-pixel location, the motion prediction/compensation with sub-pixel precision is implemented through interpolation performed on a reference picture. The video and audio lossy compression standard MPEG1 uses motion prediction/compensation with half ($\frac{1}{2}$) pixel precision, and a reference pixel at a half pixel location for the motion prediction/compensation with half ($\frac{1}{2}$) pixel precision is generated by using a bilinear interpolation method. The video codec standard H.264 uses motion prediction/compensation with $\frac{1}{4}$ pixel precision. With improvement of interpolation precision, efficiency of motion prediction/compensation is improved to some extent. However, as precision of an MV that should be transmitted improves, a quantity of used bits increases accordingly. For example, compared with the $\frac{1}{4}$ pixel precision, coding efficiency with $\frac{1}{8}$ pixel precision is not improved obviously within a medium and low bit rate range. Because of diversity of motion and a textures, motion prediction precision improvement has different impact on different blocks. For example, for a region with a relatively flat texture, a coding effect brought by motion prediction precision improvement is limited, and for a region with a relatively complex texture, improvement of a coding effect brought by motion prediction precision improvement is relatively obvious.

The foregoing briefly describes some basic content of video picture encoding and decoding with reference to FIG. 2 and FIG. 3. It should be understood that an encoding process and a decoding process in the method in the embodiments of this application may be shown in FIG. 2 and FIG. 3. The following describes a video picture processing method in the embodiments of this application with reference to the accompanying drawings.

When sub-pictures are independently encoded, because quantization error distribution features of the sub-pictures are independent of each other, when a decoder side splices the sub-pictures, an obvious border is generated at a boundary between different sub-pictures. To resolve this problem, an overlap processing method may be used. In the overlap processing method, essentially, a border between adjacent sub-pictures is extended, and then weighted processing is performed on an overlapping region between the sub-pictures, to eliminate a border generated when sub-pictures are spliced.

Specifically, the overlap processing method mainly includes step 101 to step 106. The following separately describes in detail step 101 to step 106.

101. An encoder side divides a to-be-encoded video picture, to obtain a plurality of sub-pictures.

102. The encoder side extends picture borders of each sub-picture, to obtain an extended sub-picture.

That the encoder side extends the picture borders of the sub-picture may alternatively be referred to as that the encoder side performs content extension or pixel extension on the picture borders of the sub-picture. Extension content may alternatively be referred to as a "guard band".

Generally, extension content of a sub-picture is continuous with original picture content of the sub-picture, and the extension content may be considered as extension of the original picture content of the sub-picture. To facilitate determining whether picture borders of a sub-picture have been extended and determining extension widths, the omnidirectional media application format (OMAF) standard (which may alternatively be referred to as the ISO/IEC 23090-2 standard) specifies an extension flag bit and extension widths of a sub-picture, where a value of the extension flag bit is used to indicate whether content extension has been performed on the sub-picture, and the extension widths are used to indicate content extension widths.

103. The encoder side generates location information and extension information of the plurality of sub-pictures.

104. The encoder side encodes the plurality of sub-pictures and the location information and the extension information of the plurality of sub-pictures, to obtain bitstreams.

105. A decoder side obtains the bitstreams.

106. The decoder side parses the bitstreams, to obtain the plurality of sub-pictures and the location information and the extension information of the plurality of sub-pictures.

107. The encoder side splices the plurality of sub-pictures based on the location information of the plurality of sub-pictures.

108. The encoder side performs weighted processing on an overlapping region between the plurality of sub-pictures, to obtain a to-be-displayed picture.

When the overlap processing method is used, a border generated when sub-pictures are spliced can be eliminated. However, in the overlap processing method, picture borders of each sub-picture should be extended, and content of an extended part overlaps original content of the sub-picture to some extent, leading to data redundancy, and reducing the encoding efficiency. In addition, after the picture borders of each sub-picture are extended, extension information of each sub-picture should be added during encapsulation. Consequently, an extra transmission bandwidth should be added during bitstream transmission.

Therefore, although the border generated when the sub-pictures are spliced can be better eliminated by using the overlap processing method, the method reduces the encoding efficiency and adds the extra transmission bandwidth.

In order to ensure the encoding efficiency and not add the transmission bandwidth, a deblocking filtering method (which may alternatively be directly briefly referred to as filtering) may further be used to eliminate the border generated when the sub-pictures are spliced.

Specifically, the deblocking filtering method mainly includes step 201 to step 207. The following separately describes in detail step 201 to step 207.

201. An encoder side divides a to-be-encoded video picture, to obtain a plurality of sub-pictures.

202. The encoder side separately encodes the plurality of sub-pictures, to obtain bitstreams.

203. A decoder side obtains the bitstreams.

204. The decoder side parses the bitstreams, to obtain the plurality of sub-pictures.

205. The decoder side performs deblocking filtering on the plurality of sub-pictures, to obtain a to-be-displayed picture.

Optionally, the to-be-encoded video picture may be a planar picture obtained after an initial picture is sampled. When the to-be-encoded video picture is obtained by sampling the initial picture, a sampling rate of a picture in a partial region is higher, and a sampling rate of a picture in a partial region is lower. After the to-be-encoded video picture is obtained, region division may be performed, to obtain the plurality of sub-pictures. The plurality of sub-pictures may be classified into two categories: a first-category sub-picture and a second-category sub-picture. The first-category sub-picture corresponds to a picture in a first region of the initial picture, and the second-category sub-picture corresponds to a picture in a second region of the initial picture. A sampling rate is lower when the picture in the first region is sampled, and a sampling rate is higher when the picture in the second region is sampled. Therefore, the first-category sub-picture is a sub-picture obtained at a low sampling rate (it may also be considered that pixel redundancy of the first-category sub-picture is higher), and the second-category sub-picture is a sub-picture obtained at a high sampling rate (it may also be considered that pixel redundancy of the second-category sub-picture is higher).

During sub-picture division, a larger area may be divided for the first-category sub-picture, and a smaller area may be divided for the second-category sub-picture. Before encoding, to reduce a bit rate, the first-category sub-picture may be downsampled, so that resolution of the downsampled first-category sub-picture is the same as resolution of the second-category sub-picture. In this way, a width of a border caused when the first-category sub-picture is encoded is extended. However, because performing deblocking filtering on a decoded upsampled picture cannot affect pixels in a large range, an effect of filtering the first-category sub-picture by using the deblocking filtering method is not obvious.

It should be understood that the to-be-encoded video picture may be a planar picture obtained after the initial picture is sampled. A sampling rate is lower when the first-category sub-picture is obtained based on the initial picture, and a sampling rate is higher when the second-category sub-picture is obtained based on the initial picture.

A better effect can be achieved when a border between sub-pictures of the second-category sub-picture is corrected by using the deblocking filtering method, while an effect of correcting a border between sub-pictures of the first-category sub-picture is less satisfactory.

In conclusion, there is a problem when a border generated when sub-pictures are spliced is eliminated by using only the overlap processing method or the deblocking filtering method. Therefore, a new video picture processing method is proposed, so that the border generated when the sub-pictures are spliced is better eliminated while the encoding efficiency is ensured.

Therefore, based on features of the foregoing two methods, this application provides a video picture processing method. The following describes in detail the video picture processing method in the embodiments of this application with reference to FIG. 4 to FIG. 8.

Figures 4, 5:
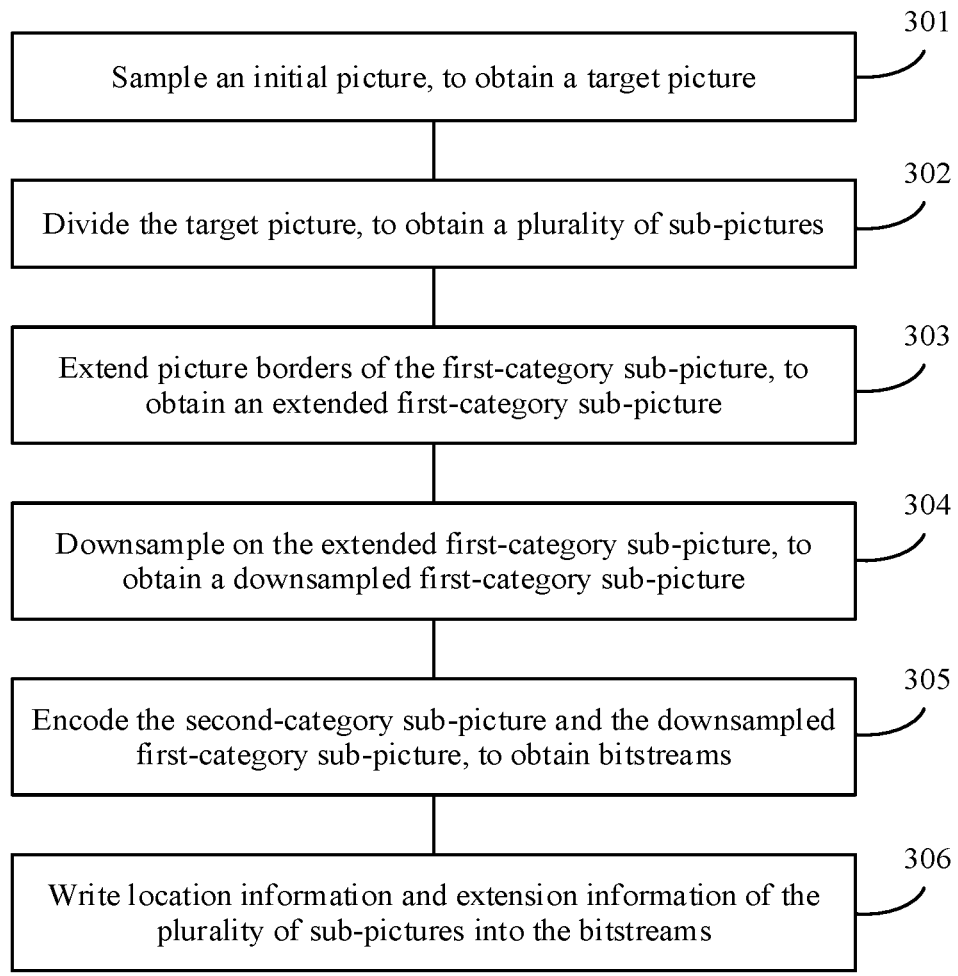
FIG. 4 is a schematic flowchart of a video picture processing method according to an embodiment of this application.
FIG. 5 is a schematic diagram of a plurality of sub-pictures obtained by dividing a target picture.

FIG. 4 is a schematic flowchart of a video picture processing method according to an embodiment of this application. The method shown in FIG. 4 includes step 301 to step 306. The following separately describes in detail step 301 to step 306.

301. Sample an initial picture, to obtain a target picture.

302. Divide the target picture, to obtain a plurality of sub-pictures, where the plurality of sub-pictures include a first-category sub-picture and a second-category sub-picture, the first-category sub-picture is obtained by sampling a picture in a first region of the initial picture, the second-category sub-picture is obtained by sampling a picture in a second region of the initial picture, a sampling rate of the picture in the first region of the initial picture is lower than a sampling rate of the picture in the second region of the initial picture, and resolution of the first-category sub-picture is higher than resolution of the second-category sub-picture.

Optionally, the initial picture is a panoramic video picture, a spherical picture, a spherical video picture, or a three-dimensional picture.

The target picture may be a two-dimensional picture in a longitude and latitude map format or a two-dimensional picture in a polyhedron format. The two-dimensional picture in the polyhedron format includes a two-dimensional picture in a format such as a tetrahedron, a hexahedron, or an octahedron.

The two-dimensional picture herein may alternatively be referred to as a planar picture.

Specifically, when the initial picture is a spherical picture, and the target picture is a two-dimensional picture in a longitude and latitude map format, the target picture may be obtained by sampling the spherical picture. In a process of sampling the spherical picture, sampling rates of pictures in polar parts are lower, the first-category sub-picture may be obtained by sampling the pictures in the polar parts, a sampling rate of a picture in an equator part is higher, and the second-category sub-picture may be obtained by sampling the picture in the equator part.

That the resolution of the first-category sub-picture is higher than the resolution of the second-category sub-picture may alternatively mean that a quantity of pixels in the first-category sub-picture is greater than a quantity of pixels in the second-category sub-picture.

For example, FIG. 5 is used as an example. An encoder side divides the target picture, to obtain first-category sub-pictures sub0 to sub2 and sub11 to sub13 and second-category sub-pictures sub3 to sub10. Resolution of the target picture is 3840×1920, resolution of the first-category sub-pictures is 1280×480, and resolution of the second-category sub-pictures is 960×480.

Figure 6:
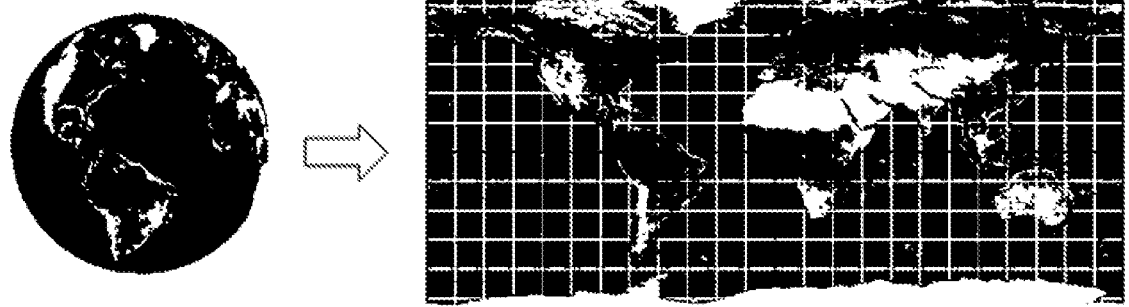
FIG. 6 shows a two-dimensional picture in a longitude and latitude map format.

For example, a two-dimensional picture in a longitude and latitude map format is shown in FIG. 6. When the target picture is the two-dimensional picture in the longitude and latitude map format shown in FIG. 6, the first-category sub-pictures are equivalent to sub-pictures in polar parts, a corresponding sampling rate is higher when the sub-pictures in these parts are obtained, the second-category sub-pictures are equivalent to sub-pictures in medium and low latitudes (an equator part), and a corresponding sampling rate is lower when the sub-pictures in these parts are obtained.

303. Extend picture borders of the first-category sub-picture, to obtain an extended first-category sub-picture.

304. Downsample on the extended first-category sub-picture, to obtain a downsampled first-category sub-picture, where resolution of the downsampled first-category sub-picture is the same as the resolution of the second-category sub-picture.

The following describes, in detail by using sub0 in FIG. 5 as an example, extension and zooming on a left picture border, a right picture border, a top picture border, and a bottom picture border of sub0.

Extension on the left picture border of sub0:
Content of a left picture of sub0 is continuous with that of a right picture of sub2. The left picture border of sub0 may be extended, and extension content is obtained from the right side of sub2.

Extension on the right picture border of sub0:
Content of a right picture of sub0 is continuous with that of a left picture of sub1. The right picture border of sub0 may be extended, and extension content is obtained from the left side of sub1.

Extension on the top picture border of sub0:
There is no other sub-picture on a top side of sub0. Therefore, the top picture border of sub0 is not extended.

Extension on the bottom picture border of sub0:
Although content of a bottom picture of sub0 is continuous with picture content of sub3 and sub4, sub3 and sub4 are sub-pictures on which border extension has been performed. Therefore, content extension is not performed on the bottom picture border of sub0.

It is assumed that when the picture borders of sub0 are extended, an extension width of each border is 96 pixels. Then, resolution of extended sub0 is 1472×480, to obtain an extended sub-picture. Next, the extended sub-picture is downsampled and zoomed, so that resolution of the extended sub-picture is 960×480.

Processing may be performed on sub1 and sub2 and sub11 to sub13 according to the foregoing method for processing sub0, to obtain extended and zoomed sub-pictures.

305. Encode the second-category sub-picture and the downsampled first-category sub-picture, to obtain bitstreams.

306. Write location information and extension information of the plurality of sub-pictures into the bitstreams.

Location information is used to indicate a location of a sub-picture in the target picture. For extension information, extension information of the first-category sub-picture is different from extension information of the second-category sub-picture. The extension information of the first-category sub-picture is used to indicate that the picture borders of the first-category sub-picture have been extended and indicate extension widths of the picture borders of the first-category sub-picture, the extension information of the second-category sub-picture is used to indicate that picture borders of the second-category sub-picture have not been extended.

In this application, only picture borders of a sub-picture (the first-category sub-picture) obtained at a low sampling rate are extended, and picture borders of a sub-picture (the second-category sub-picture) obtained at a high sampling rate are not extended, so that after picture splicing, a decoder side can perform weighted processing only on an overlapping region between sub-pictures obtained at a low sampling rate, and perform filtering processing on a border region between sub-pictures obtained at a high sampling rate and a border region between a sub-picture obtained at a high sampling rate and a sub-picture obtained at a low sampling rate. Therefore, after picture splicing, the decoder side processes overlapping and border regions between different sub-pictures in different manners based on different types of the sub-pictures, thereby better eliminating a picture border generated when sub-pictures are spliced.

Optionally, in an embodiment, the writing location information and extension information of the plurality of sub-pictures into the bitstreams includes: encapsulating location information and extension information of each of the plurality of sub-pictures into a same box.

During encoding, location information and extension information of a sub-picture are encapsulated into a same box, so that a quantity of syntactic elements can be reduced, thereby reducing a transmission bit rate.

Optionally, in an embodiment, the writing location information and extension information of the plurality of sub-pictures into the bitstreams includes: encapsulating the location information and the extension information of the plurality of sub-pictures into SEI or a MPD.

The SEI may alternatively be referred to as a supplemental enhancement message, and the SEI is a type of a NALU defined in video encoding and decoding standards h.264 and h.265 released by the ITU. The SEI may be used to assist in decoding, displaying, and the like.

During encoding, location information and extension information of a sub-picture may be added to the SEI, and during decoding, the decoder side may obtain location information and extension information of a corresponding sub-picture by parsing the SEI. It should be understood that one piece of SEI may carry location information and extension information of only one sub-picture, or may carry location information and extension information of a plurality of sub-pictures.

For example, when one piece of SEI carries location information and extension information of only one sub-picture, SEI carries location information and extension information of an $i^{th}$ (i is an integer greater than or equal to 0) sub-picture. Syntax included in the SEI is shown in Table 1.

TABLE 1

|  | Descriptor |
|---|---|
| region_hybrid_deblocking_info ( ){ |  |
| num_subRegion_minus1 | ue(v) |
| for(i=0;i<=num_subRegion_minus1;i++) { |  |
| guard_band_flag [i] | u(1) |
| if(guard_band_flag[i]) { |  |
| org_width[i] | ue(v) |
| org_height[i] | ue(v) |
| left_gb_width [i] | ue(v) |
| right_gb_width [i] | ue(v) |
| up_gb_width [i] | ue(v) |
| down_gb_width [i] | ue(v) |
| } |  |
| } |  |
| } |  |

In the foregoing Table 1, Descriptor represents an indicator, ue(n) represents unsigned exponential Golomb entropy coding, u(n) represents n consecutive bits, and a value obtained after decoding is an unsigned integer.

Meanings of syntactic elements in region hybrid deblocking info in Table 1 are as follows:

num_subRegion_minus1 indicates a quantity of sub-pictures minus 1;

guard_band_flag[i] indicates whether picture borders of the $i^{th}$ sub-picture have been extended, where 0 indicates that the picture borders have not been extended, and 1 indicates that the picture borders have been extended;

org_width[i] indicates a picture width of the $i^{th}$ sub-picture before extension if the picture borders have been extended;

org_height[i] indicates a picture height of the $i^{th}$ sub-picture before extension if the picture borders have been extended;

left_gb_width[i] indicates a left extension width of the $i^{th}$ sub-picture if the picture borders have been extended;

right_gb_width[i] indicates a right extension width of the $i^{th}$ sub-picture if the picture borders have been extended;

top_gb_height[i] indicates a top extension width of the $i^{th}$ sub-picture if the picture borders have been extended; and bottom_gb_height[i] indicates a bottom extension width of the $i^{th}$ sub-picture if the picture borders have been extended.

The MPD is a document specified in the standard ISO/IEC 23009-1, and the document includes metadata used by a client to construct a hypertext transfer protocol-uniform resource locator (HTTP-URL). The MPD includes one or more period elements. Each period element includes one or more adaptation sets, each adaptation set includes one or more representations, and each representation includes one or more segments. The client selects a representation based on information in the MPD, and constructs an HTTP-URL of a segment.

During encoding, the location information and the extension information of the plurality of sub-pictures may be added to the MPD. During decoding, the decoder side may obtain the location information and the extension information of each sub-picture by parsing the MPD.

Optionally, the MPD may indicate, based on whether a field EssentialProperty includes an attribute regblk, whether different processing should be performed on different types of sub-pictures during decoding.

Specifically, when the field EssentialProperty includes the attribute regblk, the decoder side is instructed to perform weighted processing on an overlapping region between sub-pictures on which border extension has been performed, to eliminate a border, and filter a border region between a sub-picture on which border extension has been performed and a sub-picture on which border extension has not been performed, and filter a border region between sub-pictures on which border extension has not been performed, to eliminate borders. When the field EssentialProperty does not include the attribute regblk, the decoder side is instructed to process, in a uniform manner, borders generated when sub-pictures are spliced.

It should be understood that when the field EssentialProperty includes the attribute regblk, the field EssentialProperty further includes a value of value, and the value of value is specifically used to indicate a width and a height of a sub-picture before extension, and extension widths in different directions during picture border extension.

For example, the MPD includes the following syntax:

```
<?xml version="1.0" encoding="UTF-8"?>
<MPD
    xmlns="urn:mpeg:dash:schema:mpd:2011"
    type="static"
    mediaPresentationDuration="PT10S"
    minBufferTime="PT1S"
    profiles="urn:mpeg:dash:profile:isoff-on-demand:2011">
    <Period>
<!—-Tile 0-->
<AdaptationSet segmentAlignment="true" subsegmentAlignment="true"
```

-continued

```
subsegmentStartsWithSAP="1">
        <EssentialProperty  schemeIdUri="urn:mpeg:dash:regblk:2014"
value="1,1280,640,96,96,0,0"/>
        <Representation mimeType="video/mp4" codecs="avc1.42c00d"
width="640" height="640" bandwidth="79707" startWithSAP="1">
            <BaseURL> tile1.mp4</BaseURL>
        <SegmentBase  indexRangeExact="true"  indexRange="837-
988"/>
        </Representation>
    </AdaptationSet>
    <!---Tile 1-->
    <AdaptationSet segmentAlignment="true" subsegmentAlignment="true"
subsegmentStartsWithSAP="1">
        <EssentialProperty  schemeIdUri="urn:mpeg:dash:regblk:2014"
value="0,0,0,0,0,0,0"/>
        <Representation mimeType="video/mp4" codecs="avc1.42c00d"
width="640" height="640" bandwidth="79707" startWithSAP="1">
            <BaseURL> tile1.mp4</BaseURL>
        <SegmentBase  indexRangeExact-"true"  indexRange="837-
988"/>
        </Representation>
        </AdaptationSet>
    ...
    </Period>
</MPD>
```

It should be understood that the syntactic element value includes a plurality of fields, and these fields include guard_band_flag, org_width, org_height, left_gb_width, right_gb_width, top_gb_height, and bottom_gb_height. Meanings of the fields are as follows:

guard_band_flag indicates whether picture borders of a current sub-picture have been extended, where when the value is 0, it indicates that the picture borders have not been extended, and when the value is 1, it indicates that the picture borders have been extended;

org_width indicates a sub-picture width before extension if the picture borders have been extended;

org_height indicates a sub-picture height before extension if the picture borders have been extended;

left_gb_width indicates a left extension width of the sub-picture if the picture borders have been extended;

right_gb_width indicates a right extension width of the sub-picture if the picture borders have been extended;

top_gb_height indicates a top extension width of the sub-picture if the picture borders have been extended; and bottom_gb_height indicates a bottom extension width of the sub-picture if the picture borders have been extended.

For example, in a syntactic element included in Tile 0, the field EssentialProperty includes the attribute regblk. Therefore, during decoding, borders generated when different types of sub-pictures are spliced should be processed by using different processing manners. A value of value is 1, 1280, 640, 96, 96, 0, 0, representing that one sub-picture is indicated, a width and a height of the sub-picture before extension are respectively 1280 and 640, both extension widths of a left border and a right border of the sub-picture are 96, and both extension widths of a top border and a bottom border of the sub-picture are 0.

In the syntactic element included in Tile 1, the field EssentialProperty does not include the attribute regblk, and a value of value is 0, 0, 0, 0, 0, 0, 0. Therefore, during decoding, borders generated when different types of sub-pictures are spliced are processed by using one processing manner.

It should be understood that in this application, all of a width and a height before extension and extension widths in different directions may be represented by using quantities of pixels.

Optionally, extension information of a sub-picture may be added to both a field AdaptationSet and a field representation of an MPD file.

It should be understood that the method shown in FIG. 4 may be performed on the encoder side. Step 301 to step 304 may be considered as a preprocessing process before video picture encoding, and step 305 and step 306 may be considered as a real encoding process on the video picture. The preprocessing process may be performed by a general purpose processor, the encoding process may be performed by a dedicated video encoder (which may be a chip specially configured to encode a video picture). Specifically, the preprocessing process may be performed by a general purpose processor in a video encoding apparatus, and the encoding process is performed by a video encoder in the video encoding apparatus.

Figure 7:
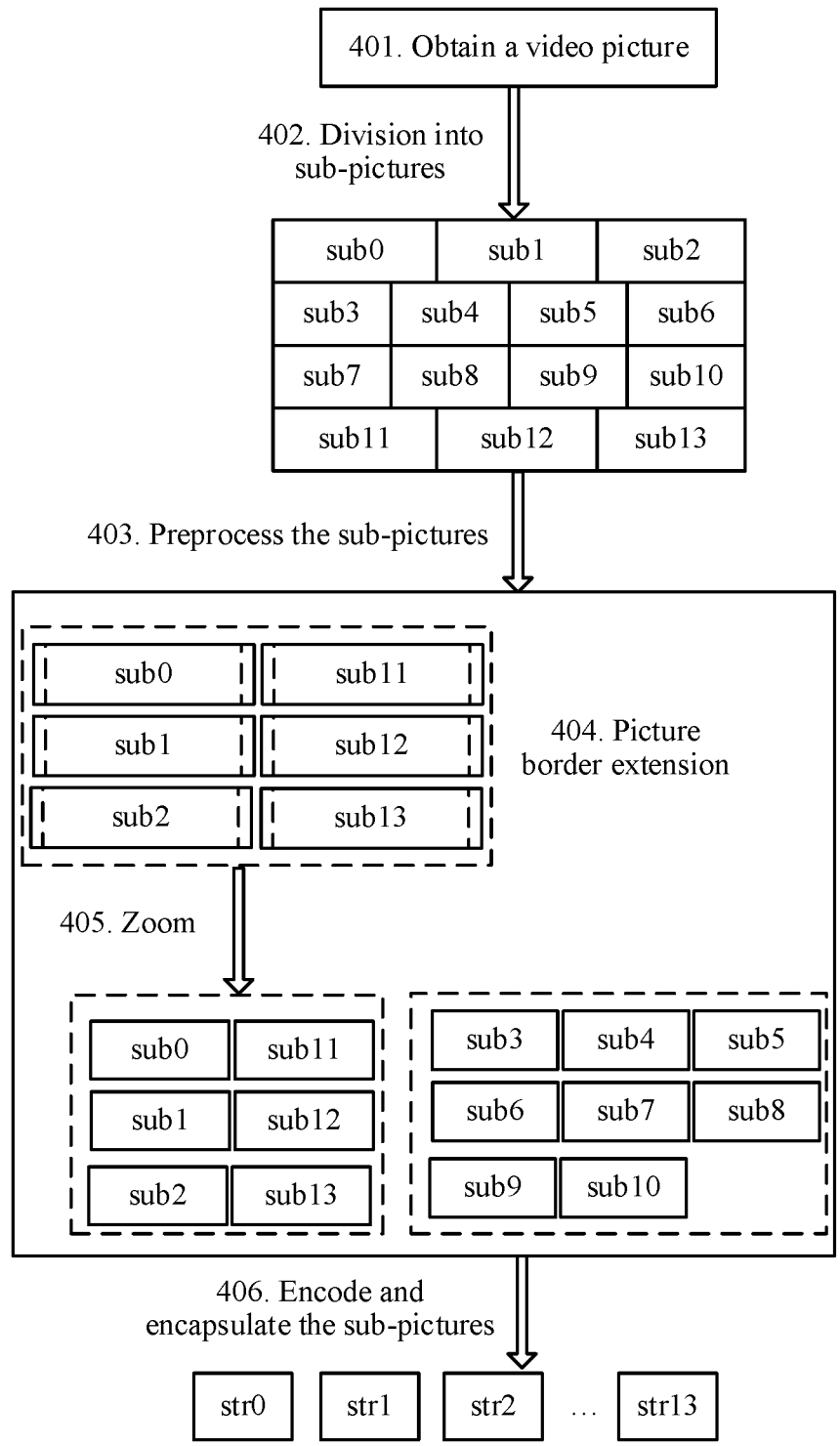
FIG. 7 is a schematic diagram of a video picture processing method according to an embodiment of this application.

The following describes in detail a video picture processing process in the embodiments of this application with reference to FIG. 7.

FIG. 7 shows a video picture processing method according to an embodiment of this application. The processing method shown in FIG. 7 may be performed by a video encoder or a server having a video encoding function. The method shown in FIG. 7 includes step 401 to step 406. The following separately describes in detail step 401 to step 406.

401. Obtain a video picture.

The video picture may be obtained by using a camera, or may be obtained from a device that stores a video picture. Optionally, the video picture may be a planar picture obtained by mapping a panoramic video picture. The planar picture includes a two-dimensional picture in a longitude and latitude format and a two-dimensional picture in a polyhedron format, and the two-dimensional picture in the polyhedron format includes a two-dimensional picture in a format such as a tetrahedron, a hexahedron, or an octahedron.

402. Divide the obtained video picture, to obtain a plurality of sub-pictures.

When region division is performed on the obtained video picture, it should be ensured that different sub-pictures do not overlap each other. In addition, because sampling rates of obtaining pictures in different regions are different (sub-pictures in some regions are pictures obtained at a high sampling rate, and sub-pictures in other regions are pictures obtained at a low sampling rate), a larger area may be divided for a sub-picture obtained at a low sampling rate (when the obtained video picture is a longitude and latitude map, a picture obtained at a low sampling rate is corresponding to a high latitude region of the longitude and latitude map), and a smaller area is divided for a sub-picture obtained at a high sampling rate (when the obtained video picture is a longitude and latitude map, a sub-picture obtained at a high sampling rate is corresponding to a medium and low latitude region of the longitude and latitude map).

The plurality of sub-pictures obtained by dividing the video picture may be shown below step 402 in FIG. 7. The plurality of sub-pictures obtained through division specifically include sub0, sub1, sub2, sub3, sub4, sub5, sub6, sub7, sub8, sub9, sub10, sub11, sub12, and sub13.

Sampling rates corresponding to the sub-pictures sub0 to sub2 and sub11 to sub13 are lower, and a corresponding picture region is larger. Sampling rates corresponding to the sub-pictures sub3 to sub10 are higher, and a corresponding picture region is smaller.

When the video picture is a longitude and latitude map, the sub-pictures sub0 to sub2 and sub11 to sub13 are corresponding to a high latitude region of the longitude and latitude map, and the sub-pictures sub3 to sub10 are corresponding to a medium and low latitude region of the longitude and latitude map.

403. Preprocess the plurality of sub-pictures.

Before the plurality of sub-pictures are encoded, the plurality of sub-pictures should be preprocessed. The preprocessing the sub-pictures includes: performing border content extension and zooming processing (or downsampling processing) on the sub-pictures.

404. Extend border content of the sub-pictures sub0 to sub2 and sub11 to sub13, to obtain extended sub-pictures.

The extending border content of a sub-picture mainly includes the following steps:

(1) determine whether target picture content that is continuous with picture content of the sub-picture exists outside borders of the sub-picture; and (2) if the target picture content exists, perform content extension on the borders of the sub-picture based on the target picture content, where content of an extended part is obtained from the target picture content; or (3) if the target picture content does not exist, skip performing content extension on picture borders of the sub-picture.

405. Zoom the extended sub-pictures, to obtain zoomed sub-pictures.

After border content of the sub-pictures sub0 to sub2 and sub11 to sub13 is extended, the extended sub-pictures further should be zoomed (or downsampled), so that resolution of zoomed sub-pictures is the same as resolution of the sub-pictures sub3 to sub10 that have not been extended.

406. Encode and encapsulate the sub-pictures that have been extended and zoomed and sub-pictures that have not been extended or zoomed.

After the sub-pictures are encoded, relative location information of each sub-picture in an original picture and extension information of the sub-picture further should be used as a box and are encapsulated together with a corresponding sub-picture bitstream, to obtain an encapsulated bitstream.

As shown in FIG. 7, after the sub-pictures sub0 to sub13 are encoded, bitstreams str0 to str13 corresponding to the sub-pictures sub0 to sub13 are obtained.

It should be understood that before step 406, extension information of each sub-picture further should be generated. Extension information of an extended and zoomed sub-picture is used to indicate that picture borders of the sub-picture have been extended and indicate extension widths, and extension information of a sub-picture that has not been extended or zoomed is used to indicate that no border extension has been performed on the sub-picture.

Specifically, the extension information may be obtained from a region-wise packing box in the technical standard (ISO/IEC DIS 23000-20 Omnidirectional Media Format). Syntax of the box is specifically as follows:

```
aligned(8) class RegionWisePackingBox extends FullBox('rwpk', 0, 0)
{
    RegionWisePackingStruct( );
}
aligned(8) class RegionWisePackingStruct
    {
    ...
    unsigned int(8) num_regions;
        ...
    for (i = 0; i < num_regions; i++)
        {
            bit(3) reserved = 0;
            unsigned int(1) guard_band_flag[i];
            unsigned int(4) packing_type[i];
            if (packing_type[i] == 0)
            {
                ...
                if (guard_band_flag[i])
                {
                    unsigned int(8) left_gb_width[i];
                    unsigned int(8) right_gb_width[i];
                    unsigned int(8) top_gb_height[i];
                    unsigned int(8) bottom_gb_height[i];
                    unsigned int(1) gb_not_used_for_pred_flag[i];
                    for(j = 0; j < 4; j++)
                        unsigned int(3) gb_type[i][j];
                    bit(3) reserved = 0;
                }
            }
        }
    }
}
```

The following describes in detail specific semantics of the syntax of the box.

num_regions indicates a quantity of sub-pictures.

The quantity that is of sub-pictures and that is indicated by num_regions may be one or more. When num_regions indicates one sub-picture, each packing box includes related information of only one sub-picture.

When num_regions indicates a plurality of sub-pictures, each packing box includes related information of the plurality of sub-pictures. For example, when a current visual angle of a user includes four sub-pictures, the four sub-pictures may be assembled into one bitstream, and related information of the four sub-pictures is encapsulated into one box. In this case, num_regions indicates four sub-pictures.

guard_band_flag[i] indicates whether picture borders of an $i^{th}$ sub-picture have been extended, where if the picture borders of the $i^{th}$ sub-picture have been extended, a value of guard_band_flag[i] is 1, or if the picture borders of the $i^{th}$ sub-picture have not been extended, a value of guard_band_flag[i] is 0.

In this embodiment of this application, a value of guard_band_flag[i] of a sub-picture with high pixel redundancy is 1, and a value of guard_band_flag[i] of a sub-picture with low pixel redundancy is 0.

FIG. 7 is used as an example, values of guard_band_flag[i] carried in bitstreams corresponding to sub-pictures sub0 to sub2 and sub11 to sub13 are 1, and values of guard_band_flag[i] carried in bitstreams corresponding to sub3 to sub10 are 0.

packing_type[i] indicates a shape obtained after picture content splicing and rearrangement, where when a value of packing_type[i] is 0, the shape obtained after picture content splicing and rearrangement is a rectangle, or when a value of packing_type[i] is 1, the shape obtained after picture content splicing and rearrangement is not a rectangle.

In this embodiment of this application, the value of packing_type[i] may be set to 0, so that a shape obtained after picture content splicing and rearrangement is a rectangle.

left_gb_width[i] indicates an extension width of a left border of the $i^{th}$ sub-picture.

The sub-picture sub0 in FIG. 7 is used as an example, and the value is 96.

right_gb_width[i] indicates an extension width of a right border of the $i^{th}$ sub-picture.

The sub-picture sub0 in FIG. 7 is used as an example, and the value is 96.

top_gb_height[i] indicates an extension width of a top border of the $i^{th}$ sub-picture.

The sub-picture sub0 in FIG. 7 is used as an example, and the value is 0.

bottom_gb_height[i] indicates an extension width of a bottom border of the $i^{th}$ sub-picture.

The sub-picture sub0 in FIG. 7 is used as an example, and the value is 0.

gb_not_used_for_pred_flag[i] indicates whether a border extension part of the $i^{th}$ sub-picture participates in inter prediction during encoding.

When a value of gb_not_used_for_pred_flag[i] is 0, it indicates that the border extension part of the $i^{th}$ sub-picture participates in inter prediction during encoding; or when a value of gb_not_used_for_pred_flag[i] is 1, it indicates that the border extension part of the $i^{th}$ sub-picture does not participate in inter prediction during encoding.

In this embodiment of this application, the sub-pictures may be independently encoded. Therefore, the value of gb_not_used_for_pred_flag[i] may be set to 1.

gb_type[i][j] indicates a manner of obtaining extension content of a $j^{th}$ border of the $i^{th}$ sub-picture, where j=0, 1, 2, 3.

j=0, 1, 2, 3 may respectively represent the left border, the right border, the top border, and the bottom border of the $i^{th}$ sub-picture.

Therefore, values of syntax of the region-wise packing box may be used to indicate information such as whether border extension has been performed on a sub-picture, a width and a height before border extension, a size of an extended region, and a width and a height of an extended and zoomed picture.

In addition, relative location information of a sub-picture in an original picture may be obtained from SubpictureRegionBox. Specific syntax of the SubpictureRegionBox is as follows:

```
aligned(8) class SubPictureRegionBox extends FullBox('sprg',0,0)
{
    unsigned int(16) track_x;
    unsigned int(16) track_y;
    unsigned int(16) track_width;
    unsigned int(16) track_height;
    unsigned int(16) composition_width;
    unsigned int(16) composition_height;
}
```

The following describes in detail syntactic meanings of SubpictureRegionBox.

track_x indicates a horizontal coordinate of a top left corner of the sub-picture in the original picture. The sub-picture sub0 in FIG. 7 is used as an example, and the value is 0.

track_y indicates a vertical coordinate of the top left corner of the sub-picture in the original picture. The sub-picture sub0 in FIG. 7 is used as an example, and the value is 0.

track_width indicates a width of the sub-picture. The sub-picture sub0 in FIG. 7 is used as an example, and the value is 1280.

track_height indicates a height of the sub-picture. The sub-picture sub0 in FIG. 7 is used as an example, and the value is 480.

composition_width indicates a width of the original picture. The sub-picture sub0 in FIG. 7 is used as an example, and the value is 3840.

composition_height indicates a height of the original picture. The sub-picture sub0 in FIG. 7 is used as an example, and the value is 1920.

The foregoing describes the video picture processing method in the embodiments of this application from a perspective of an encoder side with reference to FIG. 4 to FIG. 7. The following describes the video picture processing method in the embodiments of this application from a perspective of a decoder side with reference to FIG. 8 to FIG. 12.

Figure 8:
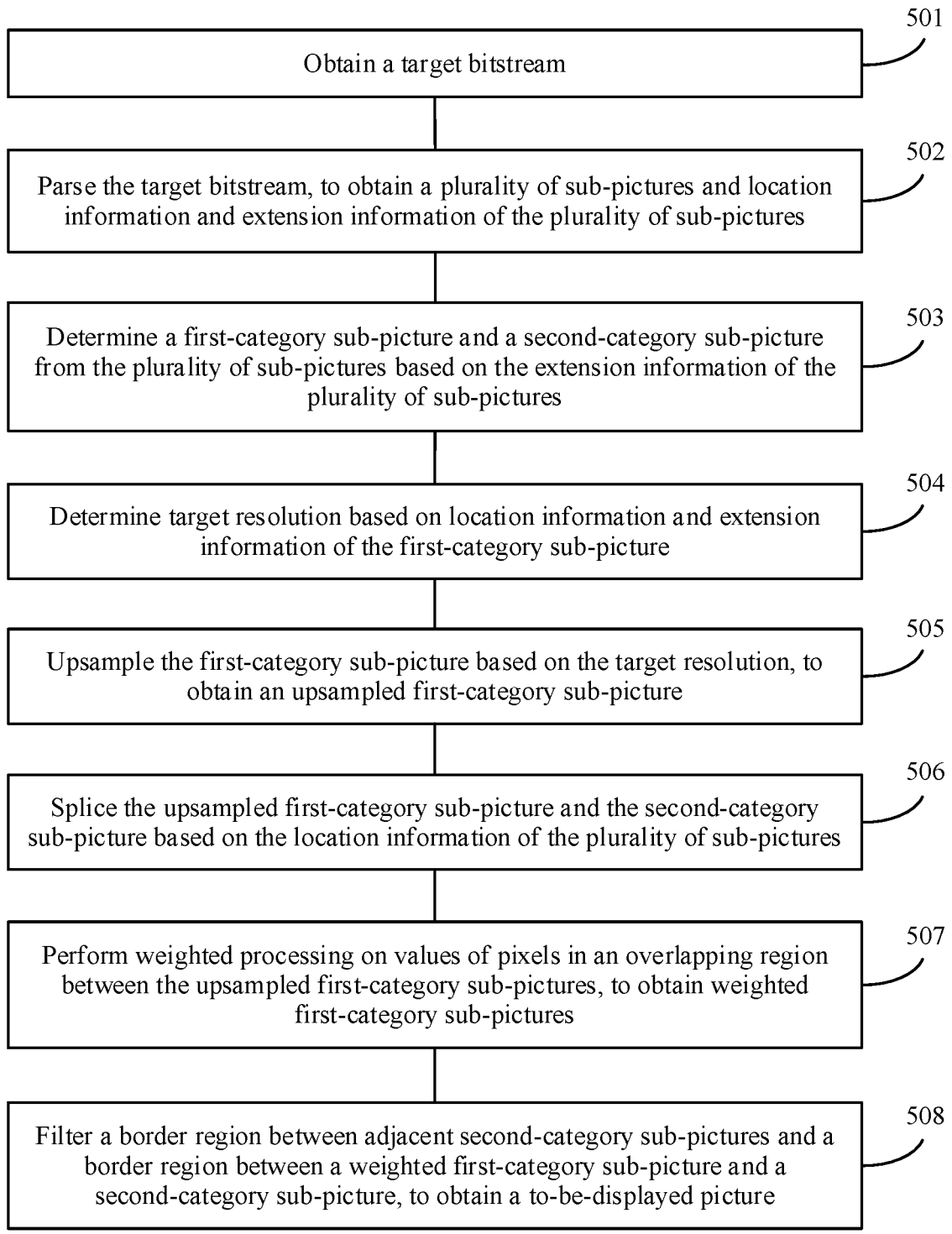
FIG. 8 is a schematic diagram of a video picture processing method according to an embodiment of this application.

FIG. 8 shows a video picture processing method according to an embodiment of this application. The processing method shown in FIG. 8 includes step 501 to step 508. The following separately describes in detail step 501 to step 508.

501. Obtain a target bitstream.

The target bitstream may be a bitstream corresponding to a video picture that a user currently needs to watch. Specifically, when the user watches a panoramic video picture, the target bitstream may be a bitstream corresponding to a picture of a current visual angle of the user.

It should be further understood that the target bitstream may be a part of a bitstream obtained after the target picture in step 301 is encoded.

502. Parse the target bitstream, to obtain a plurality of sub-pictures and location information and extension information of the plurality of sub-pictures.

Location information is used to indicate a location of a sub-picture in a to-be-displayed picture, and extension information is used to indicate whether picture borders of a sub-picture have been extended. When the extension information indicates that picture borders of a sub-picture have been extended, the sub-picture belongs to a first-category sub-picture, and the extension information is further used to indicate extension widths of the picture borders of the sub-picture, or when the extension information indicates that picture borders of a sub-picture have not been extended, the sub-picture belongs to a second-category sub-picture.

It should be understood that location information indicates a location of a sub-picture in an original picture, and also indicates a width and a height of a processed sub-picture. For example, syntax of SubpictureRegionBox not only includes a horizontal coordinate and a vertical coordinate of a sub-picture, but also indicates a width and a height of the sub-picture.

503. Determine the first-category sub-picture and the second-category sub-picture from the plurality of sub-pictures based on the extension information of the plurality of sub-pictures.

For example, as shown in FIG. 5, the first-category sub-picture may include sub0 to sub2 and sub11 to sub13, and the second-category sub-picture may include sub3 to sub10.

504. Determine target resolution based on location information and extension information of the first-category sub-picture.

Optionally, the determining target resolution based on location information and extension information of the first-category sub-picture includes: determining a width and a height of the first-category sub-picture based on the location information of the first-category sub-picture; determining extension widths of picture borders of the first-category sub-picture based on the extension information of the first-category sub-picture; and determining the target resolution based on the width and the height of the first-category sub-picture and the extension widths of the picture borders of the first-category sub-picture.

Optionally, the determining the target resolution based on the width and the height of the first-category sub-picture and the extension widths of the picture borders of the first-category sub-picture includes: extending the width and the height of the first-category sub-picture based on the extension widths of the picture borders of the first-category sub-picture, to obtain an extended target width and an extended target height; and determining a product of the target width and the target height as the target resolution.

It should be understood that all of a width and a height of a sub-picture and extension widths of picture borders may be represented by using quantities of pixels.

For example, the width and the height of the first-category sub-picture are respectively 1280 and 480, both extension widths of a left border and a right border of the first-category sub-picture are 96, and both extension widths of a top border and a bottom border of the first-category sub-picture are 0. In this case, an extended target width is 1472, and an extended target height is 480. Therefore, the target resolution is 1472×480.

Specifically, the target resolution may be obtained based on values of track_width and track_height in bitstream encapsulation information SubpictureRegionBox of the first-category sub-picture and values of left_gb_width, right_gb_width, top_gb_height, and bottom_gb_height in a region-wise packing box. Then, upsampling interpolation is performed on a decoded sub-picture based on the target resolution, to obtain an upsampled sub-picture. An upsampling interpolation algorithm includes but is not limited to methods such as bilinear interpolation, bicubic interpolation, and lanczos.

sub0 in FIG. 5 is used as an example. Values of track_width and track_height in SubpictureRegionBox corresponding to sub0 are respectively 1280 and 480, and values of left_gb_width, right_gb_width, top_gb_height, and bottom_gb_height in a region-wise packing box corresponding to sub0 are respectively 96, 96, 0, and 0. In this case, target resolution is 1472×480. Upsampling is performed on decoded sub0, to obtain a sub-picture with resolution of 1472×480.

505. Upsample the first-category sub-picture based on the target resolution, to obtain an upsampled first-category sub-picture, where resolution of the upsampled first-category sub-picture is the target resolution.

506. Splice the upsampled first-category sub-picture and the second-category sub-picture based on the location information of the plurality of sub-pictures.

507. Perform weighted processing on values of pixels in an overlapping region between the upsampled first-category sub-pictures, to obtain weighted first-category sub-pictures.

Specifically, a location of a current sub-picture in an original picture may be learned by using SubpictureRegionBox, to determine an adjacency relationship between sub-pictures, an overlapping region between adjacent sub-pictures is learned by using respective left_gb_width, right_gb_width, top_gb_height, and bottom_gb_height, and weighted processing is performed on the overlapping part between the adjacent sub-pictures, to obtain sub-pictures on which weighted processing and border processing have been performed.

508. Filter a border region between adjacent second-category sub-pictures and a border region between a weighted first-category sub-picture and a second-category sub-picture, to obtain a to-be-displayed picture, where the border region includes regions of preset sizes on two sides of a boundary between two sub-pictures.

It should be understood that the processing method shown in FIG. 8 may be performed by a decoder side, and the method shown in FIG. 8 may be performed by a decoder side device, or may be performed by a terminal device having a decoding function. Step 501 and step 502 may be performed by a decapsulation module, and step 503 to step 508 may be performed by a post-processing module.

In this application, after the plurality of sub-pictures are spliced, overlapping and border regions between different sub-pictures can be separately processed in different manners based on whether picture borders of the sub-pictures have been extended, thereby better eliminating a picture border generated when sub-pictures are spliced.

Further, in this application, border extension is performed only on some sub-pictures, but not on all sub-pictures. Therefore, a bit rate is not greatly increased in this application.

Optionally, in an embodiment, location information and extension information of each of the plurality of sub-pictures are encapsulated into a same box.

Specifically, location information of a sub-picture is encapsulated into SubpictureRegionBox. To reduce a quantity of syntactic elements, extension information of the sub-picture may also be encapsulated into SubpictureRegionBox.

Location information and extension information of a sub-picture are encapsulated into a same box, so that a quantity of syntactic elements can be reduced, thereby reducing a transmission bit rate.

Optionally, the location information and the extension information of the plurality of sub-pictures are encapsulated into supplemental enhancement information SEI or a media presentation description MPD.

The supplemental enhancement information may alternatively be referred to as a supplemental enhancement message, and the supplemental enhancement message may be used to assist in decoding, displaying, and the like.

Optionally, in an embodiment, the overlapping region between the upsampled first-category sub-pictures includes an overlapping region between a first sub-picture and a second sub-picture, a picture that is in the overlapping region and that is of the first sub-picture is an extended picture, and a picture that is in the overlapping region and that is of the second sub-picture is an overlapping picture; and the performing weighted processing on values of pixels in an overlapping region between the upsampled first-category sub-pictures includes: performing weighted processing on values of pixels that are in the extended picture and the overlapping picture and that are at a same location in the overlapping region, where a pixel that is in the overlapping picture and that is closer to a center location of the first sub-picture has a greater weighting coefficient, and a pixel that is in the extended picture and that is closer to the center location of the first sub-picture has a smaller weighting coefficient.

When weighted processing is performed on the overlapping region, a weighting coefficient is properly set, thereby improving an effect of weighted processing, and better eliminating a border generated when sub-pictures are spliced.

Optionally, weighted processing may change linearly or nonlinearly.

In addition, a weighting coefficient of a pixel that is in the overlapping picture and that is farthest from the center location of the first sub-picture is 0, and a weighting coefficient of a pixel that is in the overlapping picture and that is closest to the center location of the first sub-picture is 1. A weighting coefficient of a pixel that is in the extended picture and that is closest to the center location of the first sub-picture is 0, and a weighting coefficient of a pixel that is in the extended picture and that is farthest from the center location of the first sub-picture is 1.

Figure 9:
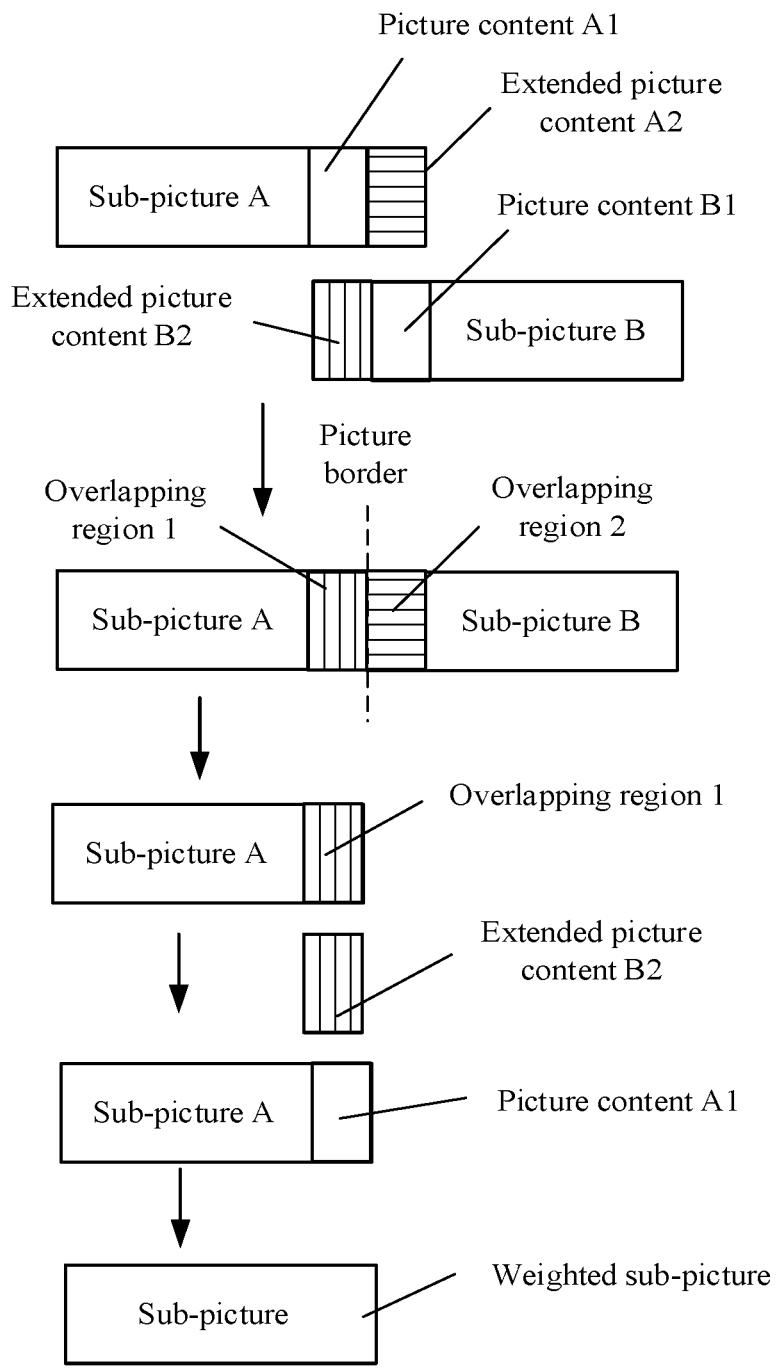
FIG. 9 is a schematic diagram of performing weighted processing on an overlapping region between a sub-picture A and a sub-picture B.

The following describes in detail a weighted processing process with reference to FIG. 9.

As shown in FIG. 9, the right side of a sub-picture A includes extended picture content A2 and picture content A1 (which may alternatively be referred to as an overlapping picture) whose area is the same as that of the extended picture content A2, and the right side of a sub-picture B includes extended picture content B2 and a picture B1 whose area is the same as that of the extended picture content B2.

After the sub-picture A and the sub-picture B are spliced based on locations of the sub-picture A and the sub-picture B, an overlapping region is formed between the sub-picture A and the sub-picture B. The overlapping region includes an overlapping region 1 located on the left side of a picture border and an overlapping region 2 located on the right side of the picture border. The overlapping region 1 includes the picture content A1 and the extended picture content B2. Therefore, performing weighted processing on values of pixels in the overlapping region 1 is essentially performing weighted processing on values of pixels in the picture content A1 and the extended picture content B2.

When weighted processing is performed on the values of the pixels in the picture content A1 and the extended picture content B2, a linear weighting method or a non-linear weighting method may be used. In addition, during weighted processing, weighting coefficients of pixels in parts that are of the extended picture content B2 and the picture content A1 and that are located at the picture border may be set to 0.5; a closer distance between the extended picture content B2 and the center of the sub-picture A indicates a lower weighting coefficient; and a closer distance between the picture content A1 and the center of the sub-picture A indicates a greater weighting coefficient (the weighting coefficient may change linearly or nonlinearly). The weighting coefficient is properly set, so that it can be ensured that picture content obtained when weighted processing is performed can smoothly transit.

It should be understood that the foregoing describes only a process of performing weighted processing on the overlapping region of the sub-picture A with reference to FIG. 9. Actually, a process of performing weighted processing on the overlapping region of the sub-picture B is similar to the process of performing weighted processing on the overlapping region of the sub-picture A. For brevity, details are not described herein again.

Optionally, in an embodiment, the filtering a border region between adjacent second-category sub-pictures and a border region between a weighted first-category sub-picture and a second-category sub-picture, to obtain a to-be-displayed picture includes: determining pixel value gradients of pictures in the border regions; and when a pixel value gradient of a picture in a border region is less than a preset gradient, performing filtering processing on the picture in the border region; or when a pixel value gradient of a picture in a border region is greater than or equal to the preset gradient, omitting filtering processing on the picture in the border region.

When a value of a pixel value gradient of a picture in a border region is larger, human eyes are insensitive to a border generated in the border region. In this case, filtering processing on the picture in the border region may be omitted. When a value of a pixel value gradient of a picture in a border region is smaller, human eyes are sensitive to a border generated in the border region. In this case, to achieve a better display effect, filtering processing should be performed on the picture in the border region. Therefore, in this application, it can be properly determined, based on sensitivity of human eyes to different pixel value gradients, whether filtering processing should be performed on a picture in a border region, and a relatively good processing manner can be selected after comprehensive consideration of a display effect and a picture processing effect.

A pixel value gradient of a picture in a border region may be determined based on pixel value change degrees of sub-pictures and a degree of a pixel value change between the sub-pictures. Specifically, when pixel value change degrees of sub-pictures on two sides of a picture border and a degree of a pixel value change between the sub-pictures are less than a preset change degree, it may be determined that the pixel value gradient of the picture in the border region is smaller, human eyes are more sensitive, and filtering processing should be performed.

When at least one of the following two cases occurs: the pixel value change degrees of the sub-pictures on the two sides of the picture border are greater than or equal to the preset change degree, and the degree of the pixel value change between the sub-pictures is greater than or equal to the preset change degree, it may be determined that the pixel value gradients of the pictures in the border region are larger. Due to a "coverage effect", human eyes are less sensitive to a picture with a larger pixel value gradient, and filtering processing does not should be performed.

Optionally, the border region includes a first region and a second region, and the performing filtering processing on the picture in the border region includes: determining a texture strength of the border region; when the texture strength of the border region is greater than or equal to a first preset strength, performing filtering processing on the border region by using a first filtering strength; or determining a texture strength of a target region when the texture strength of the border region is less than the first preset strength, where the target region is the first region or the second region; and when the texture strength of the target region is greater than or equal to a second preset strength, filtering a picture in the target region by using the first filtering strength; or when the texture strength of the target region is less than the second preset strength, filtering the picture in the target region by using a second filtering strength.

When the texture strength of the border region is less than the first preset strength, it may be considered that the texture strength of the border region is weaker. Because human eyes are more sensitive to a picture region with a weaker texture strength, texture strengths of target regions on two sides of a boundary in the border region should be further determined. When a texture strength of a target region is greater than or equal to the second preset strength, it may be considered that the texture strength of the target region is stronger. In this case, only weak filtering should be performed on the target region. When the texture strength of the target region is less than the second preset strength, it may be considered that the texture strength of the target region is weaker. In this case, only strong filtering should be performed on the target region.

Figure 10:
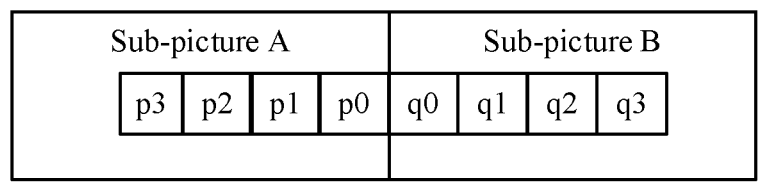
FIG. 10 is a schematic diagram of a sub-picture A and a sub-picture B that are spliced.
Figure 11:
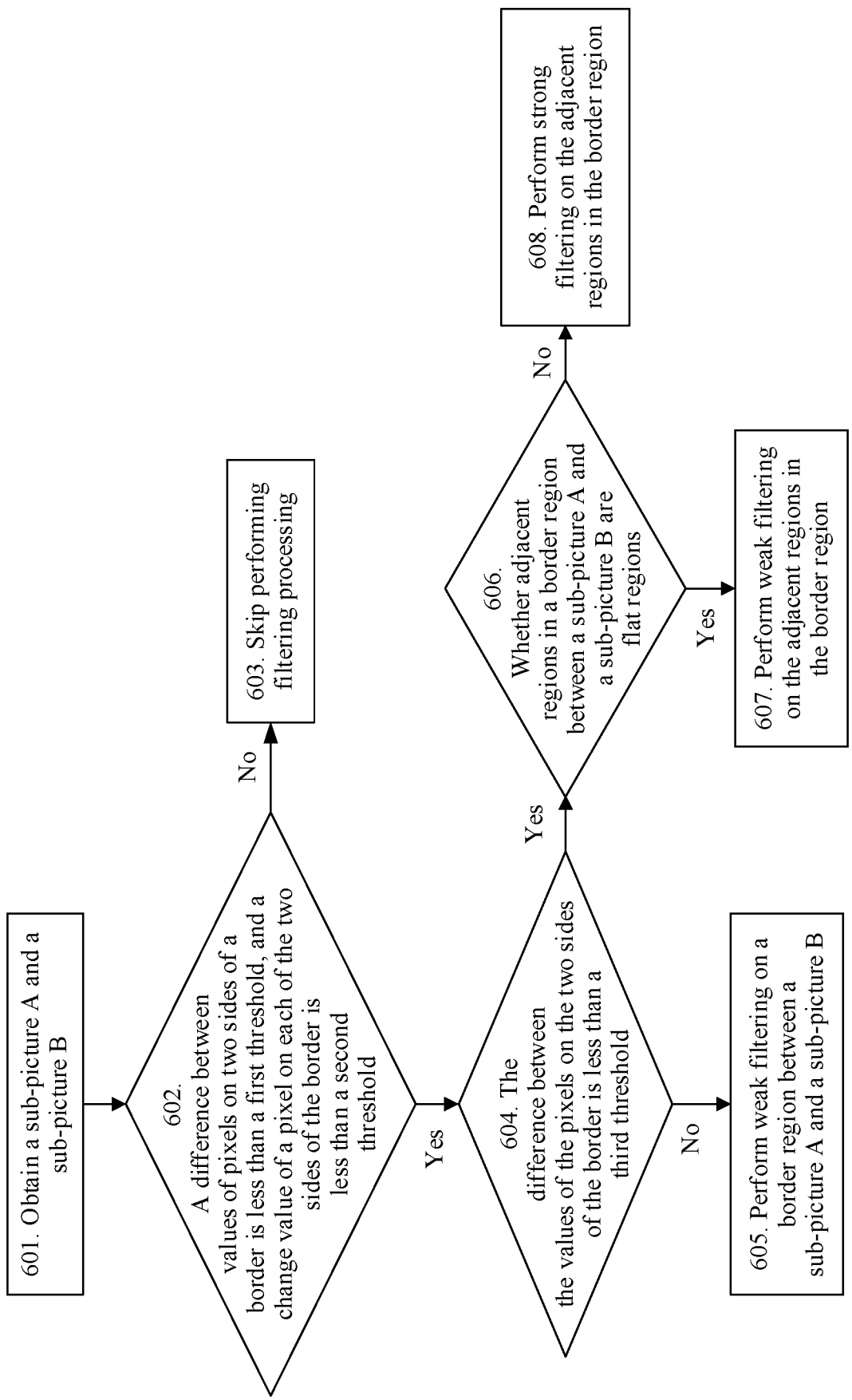
FIG. 11 is a schematic flowchart of deblocking filtering.

The following describes, in detail by using FIG. 10 and FIG. 11 as an example, a process of filtering a border region between sub-pictures by using a filtering manner.

As shown in FIG. 10, a sub-picture A borders a sub-picture B, where p0 to p3 are four pixels that are in the sub-picture A and that are closest to a picture border, and q0 to q3 are four pixels that are in the sub-picture B and that are closest to the picture border.

FIG. 11 is a schematic flowchart of filtering a border region between the sub-picture A and the sub-picture B. FIG. 11 specifically includes step 601 to step 608. The following separately describes in detail step 601 to step 608.

601. Obtain the sub-picture A and the sub-picture B.

The obtained sub-picture A and sub-picture B are shown in FIG. 10. After the sub-pictures are spliced, the sub-picture A is adjacent to the sub-picture B.

602. Determine whether a difference between values of pixels on two sides of a border between the sub-picture A and the sub-picture B is less than a first threshold, and whether a change value of a pixel value of each of the sub-picture A and the sub-picture B is less than a second threshold.

When the difference between the values of the pixels on the two sides of the border between the sub-picture A and the sub-picture B is less than the first threshold, and the change value of the pixel value of each of the sub-picture A and the sub-picture B is less than the second threshold, it may be considered that a pixel value gradient of a picture in the border region between the sub-picture A and the sub-picture B is smaller. Because human eyes are more sensitive to a region with a small gradient, filtering processing should be performed, and step 704 is performed next. When the difference between the values of the pixels on the two sides of the border between the sub-picture A and the sub-picture B is greater than or equal to the first threshold, and the change value of the pixel value of each of the sub-picture A and the sub-picture B is greater than or equal to the second threshold, it may be considered that a pixel value gradient of a picture in the border region between the sub-picture A and the sub-picture B is larger. Because human eyes are less sensitive to a region with a large gradient, filtering processing does not should be performed, and step 703 is performed next.

The first threshold and the second threshold may be obtained by looking up a table based on QP values of the sub-picture A and the sub-picture B. For example, after the sub-picture A and the sub-picture B are obtained, the QP values of the sub-picture A and the sub-picture B may be extracted, an average value of the QP values of the sub-picture A and the sub-picture B may be calculated, then, Table 2 or Table 3 is searched to determine a first threshold (gamma) used to determine whether a border between sub-pictures is obvious, and a second threshold (beta) used to determine fluctuations of sub-picture pixels on two sides of a border between the sub-pictures.

The QP value of the sub-picture A may be determined based on a QP value of each slice of the sub-picture A. For example, when the sub-picture A includes a plurality of slices, a maximum QP value corresponding to the plurality of slices may be used as the QP value of the sub-picture A, or an average QP value corresponding to the plurality of slices may be used as the QP value of the sub-picture A, or a QP value of a slice that is of the sub-picture A and that is adjacent to the sub-picture B may be used as the QP value of the sub-picture A. When the sub-picture A includes only one slice, a QP value corresponding to the slice is the QP value of the sub-picture A.

It should be understood that the QP value of the sub-picture B may also be determined by using the foregoing manner of determining the QP value of the sub-picture A.

In addition, when it is determined whether the difference between the values of the pixels on the two sides of the border between the sub-picture A and the sub-picture B is less than the first threshold, it may be specifically determined whether an inequality (1) is true.

$$|p0-q0|<\text{gamma} \qquad (1),\text{ where}$$

p0 is a pixel value of a pixel that is in the sub-picture A and that is close to the picture border, q0 is a pixel value of a pixel that is in the sub-picture B and that is close to the picture border, and gamma is the first threshold.

When it is determined whether the change value of the pixel value of each of the sub-picture A and the sub-picture B is less than the second threshold, it may be specifically determined whether inequalities (2) and (3) are true:

$$|p0-p1|<\text{beta} \qquad (2)$$

$$|q0-q1|<\text{beta} \qquad (3),\text{ where}$$

p0 and p1 are pixel values of two pixels that are in the sub-picture A and that are close to the picture border, q0 and q1 are pixel values of two pixels that are in the sub-picture B and that are close to the picture border, and beta is the second threshold.

TABLE 2

| QP | gamma | beta |
|---|---|---|
| ≤15 | 0 | 0 |
| 16 | 4 | 2 |
| 17 | 4 | 2 |
| 18 | 5 | 2 |
| 19 | 6 | 3 |
| 20 | 7 | 3 |
| 21 | 8 | 3 |
| 22 | 9 | 3 |
| 23 | 10 | 4 |
| 24 | 12 | 4 |
| 25 | 13 | 4 |
| 26 | 15 | 6 |
| 27 | 17 | 6 |
| 28 | 20 | 7 |
| 29 | 22 | 7 |
| 30 | 25 | 8 |
| 31 | 28 | 8 |
| 32 | 32 | 9 |
| 33 | 36 | 9 |

TABLE 3

| QP | gamma | beta |
|---|---|---|
| 34 | 40 | 10 |
| 35 | 45 | 10 |
| 36 | 50 | 11 |
| 37 | 56 | 11 |
| 38 | 63 | 12 |
| 39 | 71 | 12 |
| 40 | 80 | 13 |
| 41 | 90 | 13 |
| 42 | 101 | 14 |
| 43 | 113 | 14 |
| 44 | 127 | 15 |
| 45 | 144 | 15 |
| 46 | 162 | 16 |
| 47 | 182 | 16 |
| 48 | 203 | 17 |
| 49 | 226 | 17 |
| 50 | 255 | 18 |
| ≥51 | 255 | 18 |

603. Skip performing filtering processing on the border region between the sub-picture A and the sub-picture B.

604. Determine whether the difference between the values of the pixels on the two sides of the border between the sub-picture A and the sub-picture B is less than a third threshold.

The third threshold may be ¼ of the first threshold. When the first threshold is gamma, the third threshold is grammar/4.

FIG. 10 is used as an example, and when it is determined whether the difference between the values of the pixels on the two sides of the border between the sub-picture A and the sub-picture B is less than the third threshold, it may be specifically determined whether an inequality (4) is true.

$$|q0-p0|<\text{gamma}/4 \qquad (4),\text{ where}$$

p0 is a pixel value of a pixel that is in the sub-picture A and that is close to the picture border, q0 is a pixel value of a pixel that is in the sub-picture B and that is close to the picture border, and gamma/4 is the third threshold.

If a difference between two sides of the picture border between the sub-picture A and the sub-picture B is larger, there may be a large quantity of details. To avoid a loss of the details, strong filtering should not be performed, instead a weak filtering manner should be used to smooth the border. Therefore, step 705 should be performed.

If the difference between the two sides of the picture border between the sub-picture A and the sub-picture B is smaller, it may be further determined whether adjacent regions on the two sides of the border region are flat regions, to determine whether strong filtering or weak filtering is used for the adjacent regions on the two sides of the border region. Therefore, step 706 should be performed.

When the adjacent regions are flat regions, because human eyes are more sensitive to a flat region, people can perceive even small and discontinuous pixels. Therefore, strong filtering should be performed on the adjacent regions. When the adjacent regions are non-flat regions, because human eyes are less sensitive to a non-flat region, only weak filtering should be performed on the adjacent regions.

605. Perform weak filtering on the border region between the sub-picture A and the sub-picture B.

606. Determine whether adjacent regions in the border region between the sub-picture A and the sub-picture B are flat regions.

When two sides of the boundary between the sub-picture A and the sub-picture B are flat regions, step 607 is performed; or when two sides of the boundary between the sub-picture A and the sub-picture B are non-flat regions, step 608 is performed.

FIG. 10 is used as an example, and when it is determined whether the two sides of the boundary between the sub-picture A and the sub-picture B are flat regions, it may be specifically determined whether inequalities (5) and (6) are true:

$$|p0-p2|<\text{beta} \qquad (5)$$

$$|q0-q2|<\text{beta} \qquad (6),\text{ where}$$

p0 is a pixel value of a pixel that is in the sub-picture A and that is close to the picture border, p2 is a pixel value of a pixel that is in the sub-picture A and that is away from the picture border, q0 is a pixel value of a pixel that is in the sub-picture B and that is close to the picture border, q2 is a pixel value of a pixel that is in the sub-picture B and that is away from the picture border, and beta is the second threshold.

607. Perform weak filtering on the adjacent regions in the border region.

608. Perform strong filtering on the adjacent regions in the border region.

Figure 12:
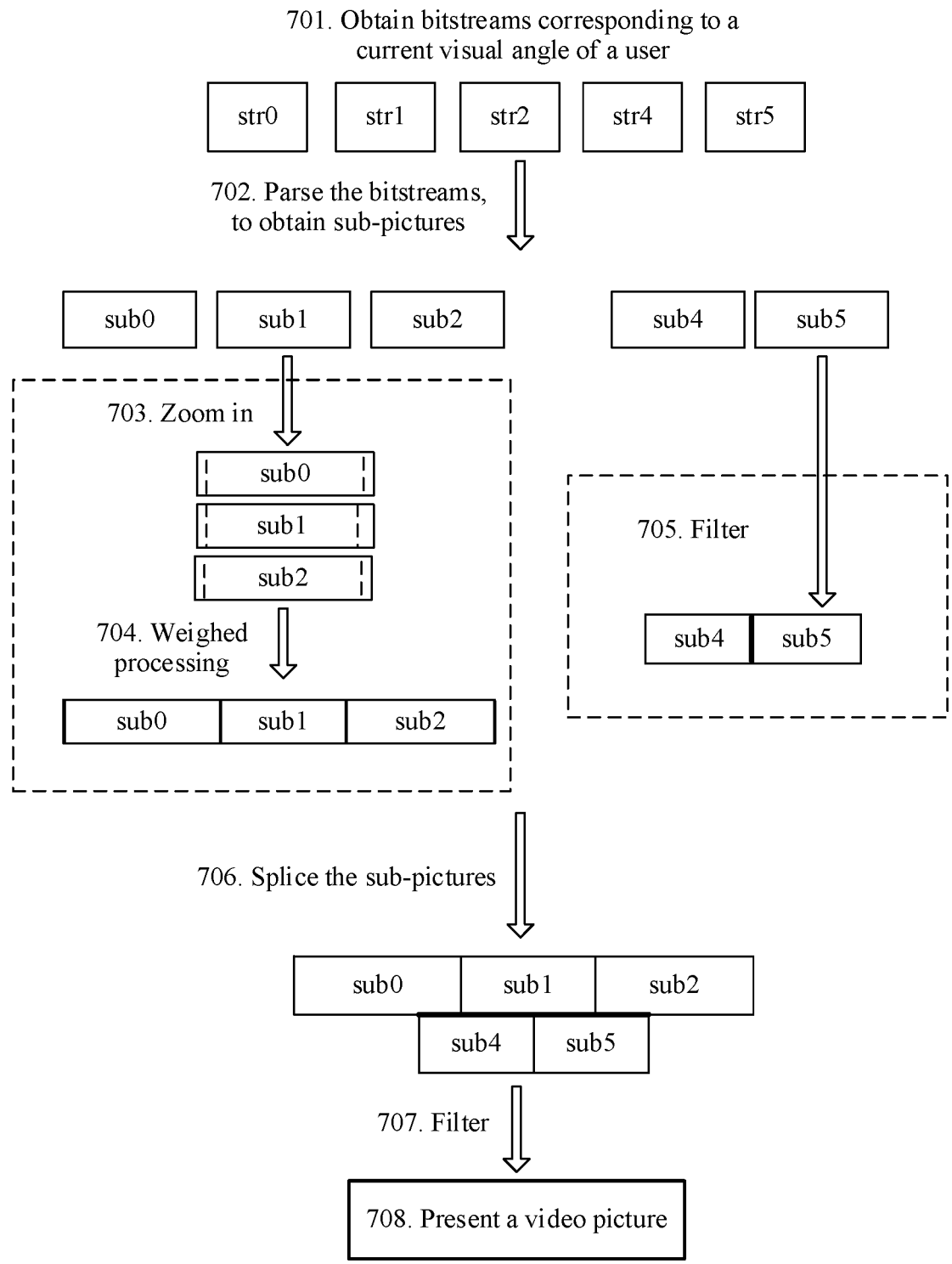
FIG. 12 is a schematic diagram of a video picture processing method according to an embodiment of this application.

The following describes in detail a video picture processing process on a decoder side in the embodiments of this application with reference to FIG. 12.

FIG. 12 is a flowchart of a video picture processing method according to an embodiment of this application. The processing method shown in FIG. 12 may be performed by a video decoder or a server having a video decoding function. The method shown in FIG. 12 includes step 701 to step 708. The following separately describes in detail step 701 to step 708.

It should be understood that the method shown in FIG. 12 is corresponding to the method shown in FIG. 7, and the method shown in FIG. 12 is equivalent to processing bitstreams obtained in the processing method shown in FIG. 7.

701. Obtain bitstreams str0 to str5 corresponding to a current visual angle of a user.

When the method shown in FIG. 12 is performed by a terminal device, the terminal device may request, from a server based on the current visual angle of the user, bitstreams corresponding to several sub-pictures within the current visual angle of the user.

702. Parse the bitstreams, to obtain sub-pictures.

The sub-pictures sub0 to sub2, sub4, and sub5 are obtained by parsing the bitstreams.

It should be understood that in step 702, when the sub-pictures sub0 to sub5 are obtained, location information and extension information of the sub-pictures sub0 to sub5 may be further obtained. Location information is used to indicate a location of a sub-picture in an original picture, and extension information is used to indicate whether border extension has been performed on picture borders of the sub-picture before encoding, and if the borders of the sub-picture have been extended before encoding, the extension information is used to indicate extension widths of the picture borders of the sub-picture.

Specifically, before the bitstreams are parsed, the bitstreams str0 to str5 may be first downloaded locally, and then decapsulated, to obtain extension information and location information of each sub-picture, and the sub-pictures sub0 to sub2 on which border extension has not been performed and the sub-pictures sub4 and sub5 on which border extension has been performed are obtained from the plurality of sub-pictures based on the extension information of the sub-pictures.

When it is determined, based on extension information of a sub-picture, whether picture borders of the sub-picture have been extended, for each sub-picture, guard_band_flag flag information may be obtained from region-wise packing box information at an encapsulation layer of a bitstream of the sub-picture, and it is determined, based on a value of the guard_band_flag flag information, whether the picture borders of the sub-picture have been extended. When the value of guard_band_flag is 0, it indicates that the picture borders of the sub-picture have been extended; or when the value of guard_band_flag is 1, it indicates that the picture borders of the sub-picture have not been extended.

703. Zoom in the sub-pictures sub0 to sub2.

After performing border extension on the sub-pictures sub0 to sub2 (equivalent to zooming in the sub-pictures), an encoder side further zooms the sub-pictures on which border extension has been performed, so that resolution of zoomed sub-pictures is the same as resolution of sub-pictures that have not been extended. Therefore, on a decoder side, after obtaining the sub-pictures sub0 to sub2 through parsing, the decoder side needs to zoom in sub0 to sub2, to restore resolution obtained after the encoder side performs border extension on sub0 to sub2.

For example, on the encoder side, resolution of the sub-pictures sub0 to sub2 obtained through division is 1280×480, resolution of sub4 and sub5 is 960×480, and resolution of sub0 to sub2 after border extension is performed on the sub-pictures sub0 to sub2 is 1472×480. Subsequently, the sub0 to sub2 on which border extension has been performed are zoomed, so that resolution of the zoomed sub0 to sub2 is 960×480. On the decoder side, resolution of sub0 to sub2, sub4, and sub5 that are obtained through decoding is 960×480. To restore resolution obtained after border extension is performed on sub0 to sub2 on the encoder side, sub0 to sub2 should be zoomed in, so that resolution of the sub0 to sub2 that are zoomed in is 1472×480.

704. Perform weighted processing on the sub-pictures sub0 to sub2 that are zoomed in.

It should be understood that when weighted processing is performed on the sub-pictures sub0 to sub2 that are zoomed in, the sub-pictures sub0 to sub2 may be spliced based on location information, and then, weighted processing is performed on overlapping regions between sub0, sub1, and sub2. For a specific weighted processing process, refer to related content shown in FIG. 9 in the foregoing specification. For brevity, details are not described herein again.

705. Filter the sub-pictures sub4 and sub5.

It should be understood that before the sub-pictures sub4 and sub5 are filtered, first, the sub-pictures sub4 and sub5 may be spliced based on location information, and then, a border region between sub4 and sub5 may be filtered. For a specific process, refer to related content in FIG. 10 and FIG. 11 in the foregoing specification. For brevity, details are not described herein again.

706. Splice the sub-pictures sub0 to sub2 on which weighted processing has been performed and the sub-pictures sub4 and sub5 on which filtering processing has been performed.

After picture splicing is performed, some borders may be generated in border regions between both of sub4 and sub5 and sub0 to sub2. To eliminate these borders, step 707 should be performed to perform filtering processing on these border regions.

707. Perform filtering processing on the border regions between both of sub4 and sub5 and sub0 to sub2.

A specific filtering processing process in step 707 is similar to the filtering processing process in step 705, and details are not described herein again.

708. Present a video picture.

After filtering processing in step 707 is performed, the to-be-presented video picture is obtained. Then, in step 708, the video picture obtained in step 707 may be presented to the user.

Figure 13:
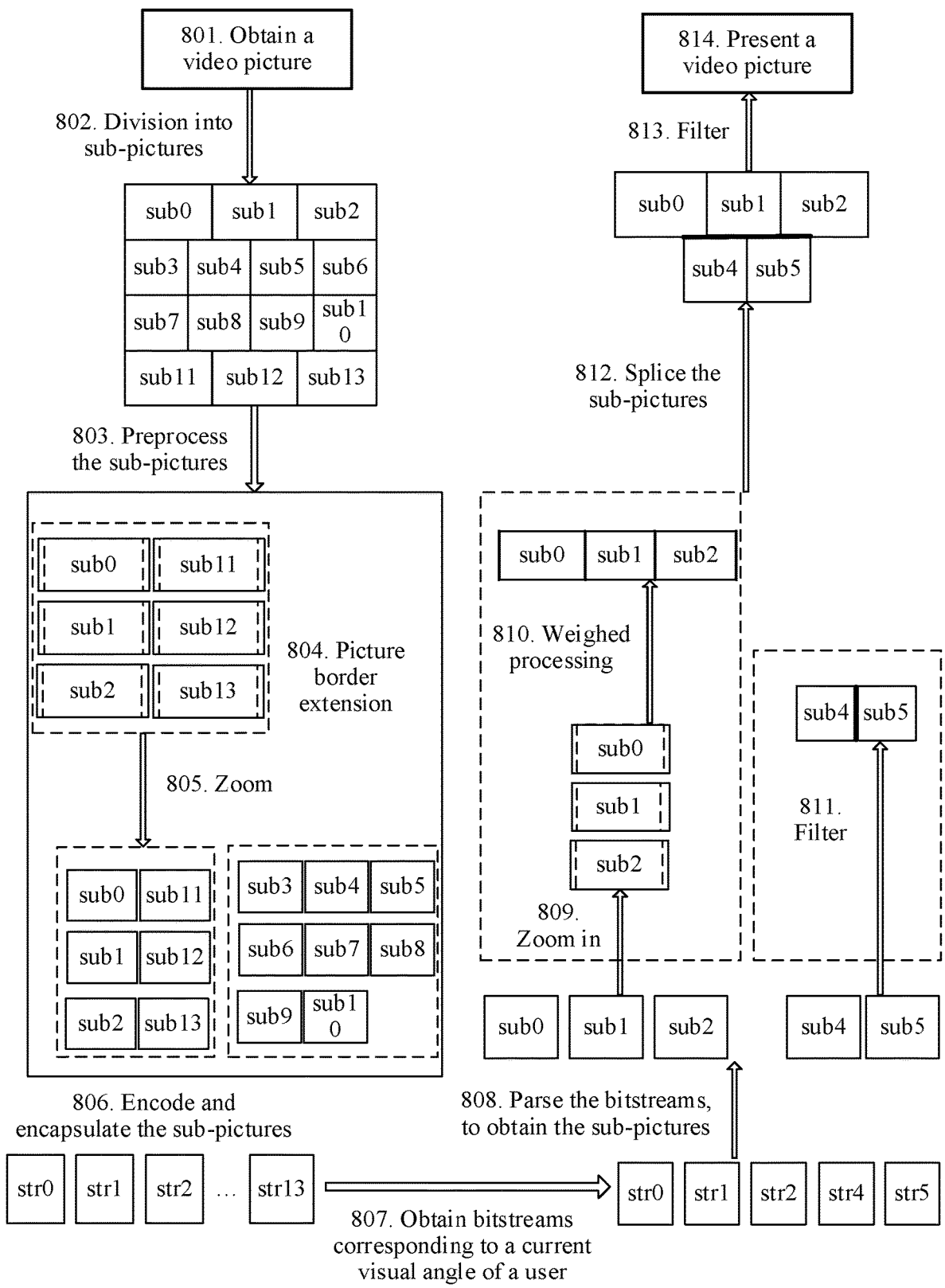
FIG. 13 is a schematic diagram of a video picture processing method according to an embodiment of this application.

FIG. 13 is a flowchart of a video picture processing method according to an embodiment of this application. The video picture processing method shown in FIG. 13 may be jointly performed by an encoder side device and a decoder side device, or may be performed by a video picture encoding and decoding system. More specifically, an encoder side may be implemented by a server, and a decoder side may be implemented by a terminal device. The method shown in FIG. 13 includes step 801 to step 814. The following separately describes step 801 to step 814.

801. Obtain a video picture.

The video picture may be directly obtained by using a camera, or may be obtained from a device that stores a video picture. Optionally, the video picture may be a planar picture obtained by mapping a panoramic video picture. The planar picture includes a two-dimensional picture in a longitude and latitude format and a two-dimensional picture in a polyhedron format, and the two-dimensional picture in the polyhedron format includes a two-dimensional picture in a format such as a tetrahedron, a hexahedron, or an octahedron.

802. Divide the video picture, to obtain sub-pictures sub0 to sub13.

Pixel redundancy of the sub-pictures sub0 to sub2 and sub11 to sub13 is higher, and corresponding picture regions have larger areas. Pixel redundancy of the sub-pictures sub3 to sub10 is lower, and corresponding picture regions have smaller areas.

It should be understood that resolution of a sub-picture having a larger picture region is higher, and resolution of a sub-picture having a smaller picture region is lower.

For example, resolution of the sub-pictures sub0 to sub2 and sub11 to sub13 is 1280×480, and resolution of the sub-pictures sub3 to sub10 is 960×480.

803. Preprocess the sub-pictures sub0 to sub13.

The preprocessing the sub-pictures sub0 to sub13 includes: performing border extension and zooming (for details, refer to step 804 and step 805) on the sub-pictures sub0 to sub2 and sub11 to sub13, and performing no processing on the sub-pictures sub3 to sub10.

804. Extend border content of the sub-pictures sub0 to sub2 and sub11 to sub13, to obtain extended sub-pictures.

It is assumed that when the picture borders of the sub-pictures are extended, an extension width of each border is 96 pixels. Then, resolution of the sub-pictures obtained after border extension is performed on the sub-pictures sub0 to sub2 and sub11 to sub13 is 1472×480.

805. Zoom the extended sub-pictures in step 804, to obtain zoomed sub-pictures.

It should be understood that in step 805, after the extended sub-pictures are zoomed, resolution of the zoomed sub-pictures may be the same as resolution of the sub-pictures on which border extension has not been performed and that are not zoomed.

For example, resolution of a sub-picture that is zoomed in is 1472×480, and resolution of a sub-picture that is not extended or zoomed is 960×480. Therefore, an extended sub-picture is zoomed, so that resolution of the zoomed sub-picture is 960×480.

806. Encode and encapsulate the sub-pictures that are extended and zoomed and the sub-pictures that are not extended or zoomed, to obtain bitstreams str0 to str13.

It should be understood that when a bitstream is generated, extension information and location information of each sub-picture further should be written into the bitstream, so that the decoder side can obtain the extension information and the location information of each sub-picture by parsing the bitstream.

807. Obtain bitstreams str0 to str5 corresponding to a current visual angle of a user.

808. Parse the bitstreams, to obtain the sub-pictures sub0 to sub2, sub4, and sub5.

809. Zoom in the sub-pictures sub0 to sub2.

810. Perform weighted processing on the sub-pictures sub0 to sub2 that are zoomed in.

811. Filter the sub-pictures sub4 and sub5.

812. Splice the sub-pictures sub0 to sub2 on which weighted processing has been performed and the sub-pictures sub4 and sub5 on which filtering processing has been performed.

813. Perform filtering processing on border regions between both of sub4 and sub5 and sub0 to sub2.

814. Present a video picture.

It should be understood that the entire process of the video picture processing method in this embodiment of this application is described in step 801 to step 814. For specific implementation details of step 801 to step 814, refer to step 401 to step 406 in the processing method shown in FIG. 7 and step 701 to step 708 in the processing method shown in FIG. 12 in the foregoing descriptions. For brevity, details are not described herein again.

The foregoing describes in detail the video picture processing method in the embodiments of this application with reference to FIG. 4 to FIG. 13. The following describes a video picture processing apparatus in the embodiments of this application with reference to FIG. 14 and FIG. 15. It should be understood that the video picture processing apparatus described in FIG. 14 and FIG. 15 can perform the steps of the video picture processing method described above. For brevity, repeated descriptions are properly omitted when the apparatus is described below.

Figure 14:
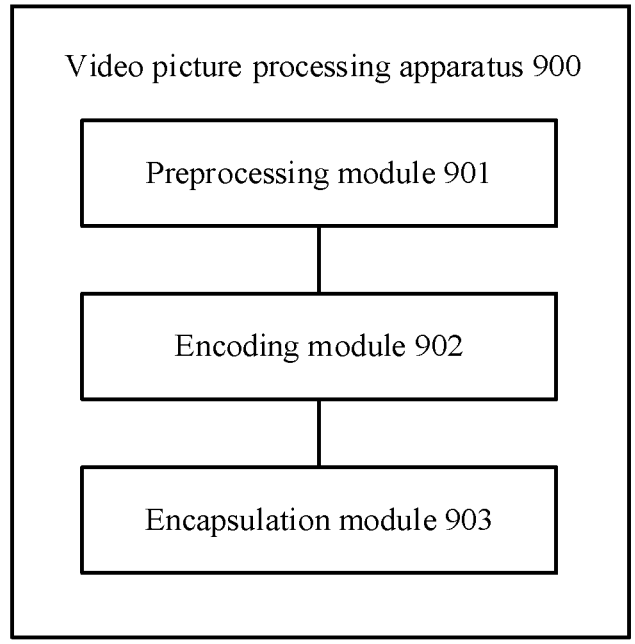
FIG. 14 is a schematic block diagram of a video picture processing apparatus according to an embodiment of this application.

FIG. 14 is a schematic block diagram of a video picture processing apparatus according to an embodiment of this application. A video picture processing apparatus 900 shown in FIG. 14 includes:

a preprocessing module 901, where the preprocessing module 901 is configured to:

sample an initial picture, to obtain a target picture;

divide the target picture, to obtain a plurality of sub-pictures, where the plurality of sub-pictures include a first-category sub-picture and a second-category sub-picture, the first-category sub-picture is obtained by sampling a picture in a first region of the initial picture, the second-category sub-picture is obtained by sampling a picture in a second region of the initial picture, a sampling rate of the picture in the first region of the initial picture is lower than a sampling rate of the picture in the second region of the initial picture, and resolution of the first-category sub-picture is higher than resolution of the second-category sub-picture;

extend picture borders of the first-category sub-picture, to obtain an extended first-category sub-picture; and downsample the extended first-category sub-picture, to obtain a downsampled first-category sub-picture, where resolution of the downsampled first-category sub-picture is the same as the resolution of the second-category sub-picture;

an encoding module 902, configured to encode the second-category sub-picture and the downsampled first-category sub-picture, to obtain bitstreams; and an encapsulation module 903, configured to write location information and extension information of the plurality of sub-pictures into the bitstreams, where location information is used to indicate a location of a sub-picture in the target picture, extension information of the first-category sub-picture is used to indicate that picture borders of the first-category sub-picture have been extended and indicate extension widths of the picture borders of the first-category sub-picture, and extension information of the second-category sub-picture is used to indicate that picture borders of the second-category sub-picture have not been extended.

In this application, only picture borders of a sub-picture (the first-category sub-picture) obtained at a low sampling rate are extended, and picture borders of a sub-picture (the second-category sub-picture) obtained at a high sampling rate are not extended, so that after picture splicing, a decoder side can perform weighted processing only on an overlapping region between sub-pictures obtained at a low sampling rate, and perform filtering processing on a border region between sub-pictures obtained at a high sampling rate and a border region between a sub-picture obtained at a high sampling rate and a sub-picture obtained at a low sampling rate. Therefore, after picture splicing, the decoder side processes overlapping and border regions between different sub-pictures in different manners based on different types of the sub-pictures, thereby better eliminating a picture border generated when sub-pictures are spliced.

Optionally, in an embodiment, the encapsulation module 903 is configured to encapsulate location information and extension information of each of the plurality of sub-pictures into a same box.

Optionally, in an embodiment, the initial picture is a planar picture obtained by mapping a panoramic video picture.

Figure 15:
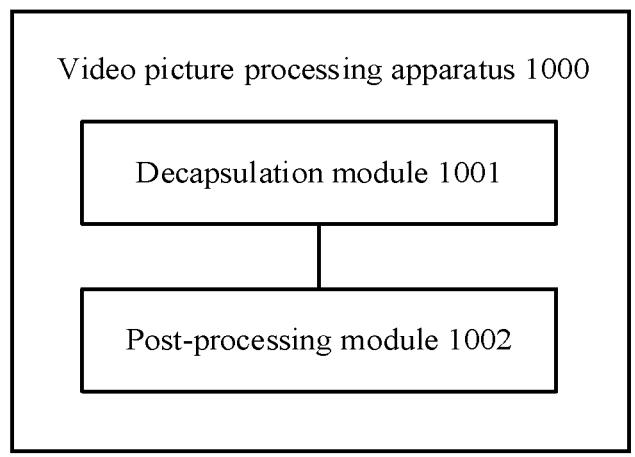
FIG. 15 is a schematic block diagram of a video picture processing apparatus according to an embodiment of this application.

FIG. 15 is a schematic block diagram of a video picture processing apparatus according to an embodiment of this application. The video picture processing apparatus 1000 shown in FIG. 15 includes:

a decapsulation module 1001, configured to obtain target bitstreams; where the decapsulation module 1001 is further configured to obtain a plurality of sub-pictures and location information and extension information of the plurality of sub-pictures, where the location information is used to indicate a location of a sub-picture in a to-be-displayed picture, and the extension information is used to indicate whether picture borders of a sub-picture have been extended, and when the extension information indicates that picture borders of a sub-picture have been extended, the sub-picture belongs to a first-category sub-picture, and the extension information is further used to indicate extension widths of the picture borders of the sub-picture, or when the extension information indicates that picture borders of a sub-picture have not been extended, the sub-picture belongs to a second-category sub-picture;

a post-processing module 1002, where the post-processing module 1002 is configured to:

determine the first-category sub-picture and the second-category sub-picture from the plurality of sub-pictures based on the extension information of the plurality of sub-pictures;

determine target resolution based on location information and extension information of the first-category sub-picture;

upsample the first-category sub-picture based on the target resolution, to obtain an upsampled first-category sub-picture, where resolution of the upsampled first-category sub-picture is the target resolution;

splice the upsampled first-category sub-picture and the second-category sub-picture based on the location information of the plurality of sub-pictures;

perform weighted processing on values of pixels in an overlapping region between the upsampled first-category sub-pictures, to obtain weighted first-category sub-pictures;

filter a border region between adjacent second-category sub-pictures and a border region between a weighted first-category sub-picture and a second-category sub-picture, to obtain the to-be-displayed picture, where the border region includes regions of preset sizes on two sides of a boundary between two sub-pictures.

In this application, after the plurality of sub-pictures are spliced, overlapping and border regions between different sub-pictures can be separately processed in different manners based on whether picture borders of the sub-pictures have been extended, thereby better eliminating a picture border generated when sub-pictures are spliced.

Optionally, in an embodiment, the processing module 1002 is configured to:

determine a width and a height of the first-category sub-picture based on the location information of the first-category sub-picture;

determine extension widths of picture borders of the first-category sub-picture based on the extension information of the first-category sub-picture;

determine the target resolution based on the width and the height of the first-category sub-picture and the extension widths of the picture borders of the first-category sub-picture.

Optionally, in an embodiment, location information and extension information of each of the plurality of sub-pictures are encapsulated into a same box.

Optionally, in an embodiment, the location information and the extension information of the plurality of sub-pictures are encapsulated into supplemental enhancement information SEI or a media presentation description MPD.

Optionally, in an embodiment, the overlapping region between the upsampled first-category sub-pictures includes an overlapping region between a first sub-picture and a second sub-picture, a picture that is in the overlapping region and that is of the first sub-picture is an extended picture, and a picture that is in the overlapping region and that is of the second sub-picture is an overlapping picture; and the post-processing module 1002 is configured to:

perform weighted processing on values of pixels that are in the extended picture and the overlapping picture and that are at a same location in the overlapping region, where a pixel that is in the overlapping picture and that is closer to a center location of the first sub-picture has a greater weighting coefficient, and a pixel that is in the extended picture and that is closer to the center location of the first sub-picture has a smaller weighting coefficient.

Optionally, in an embodiment, the processing module 1002 is configured to:

determine pixel value gradients of pictures in the border region; and when a pixel value gradient of a picture in a border region is less than a preset gradient, perform filtering processing on the picture in the border region; or when a pixel value gradient of a picture in a border region is greater than or equal to the preset gradient, omit filtering processing on the picture in the border region.

Optionally, in an embodiment, the border region includes a first region and a second region, the first region and the second region are separately located on two sides of a boundary, and the post-processing module 1002 is configured to:

determine a texture strength of the border region;

when the texture strength of the border region is greater than or equal to a first preset strength, perform filtering processing on the border region by using a first filtering strength; or determine a texture strength of a target region when the texture strength of the border region is less than the first preset strength, where the target region is the first region or the second region; and when the texture strength of the target region is greater than or equal to a second preset strength, filter a picture in the target region by using the first filtering strength; or when the texture strength of the target region is less than the second preset strength, filter the picture in the target region by using a second filtering strength.

Optionally, in an embodiment, an effect range of the first filtering strength is less than an effect range of the second filtering strength.

It should be understood that the video picture processing apparatus 900 shown in FIG. 14 may be understood as an apparatus including a video encoder. The encoding module 902 and the encapsulation module 903 in the apparatus are corresponding to the video encoder, and can implement a corresponding function of the video encoder. The following briefly describes a structure of the video encoder with reference to FIG. 16.

Figure 16:
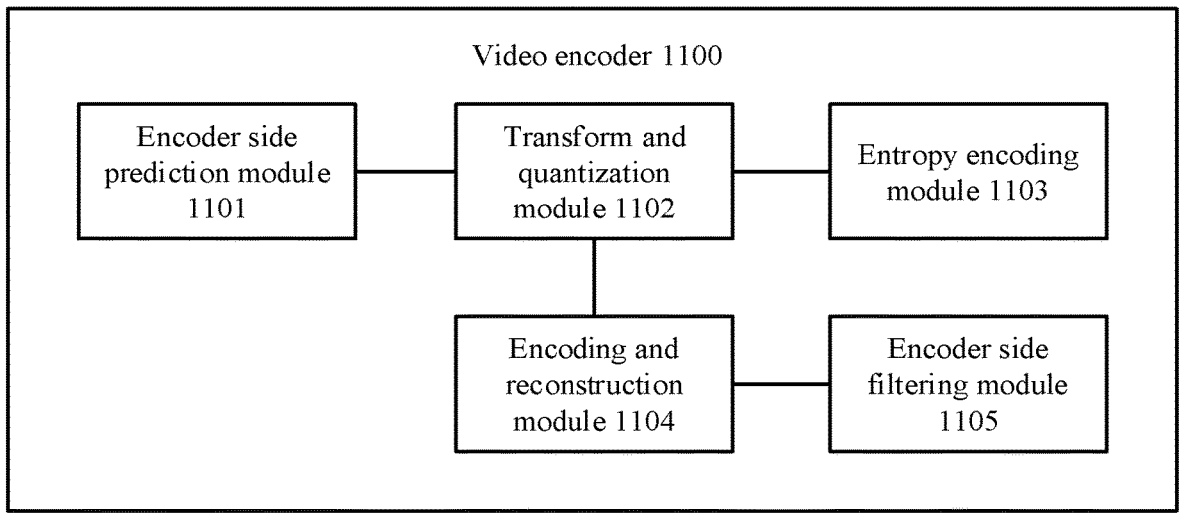
FIG. 16 is a schematic block diagram of a video encoder according to an embodiment of this application.

FIG. 16 is a schematic block diagram of a video encoder according to an embodiment of this application. The video encoder 1100 shown in FIG. 16 includes an encoder side prediction module 1101, a transform and quantization module 1102, an entropy encoding module 1103, an encoding and reconstruction module 1104, and an encoder side filtering module 1105.

It should be understood that the video encoder 1100 shown in FIG. 16 may perform a process of encoding a video picture in the video picture processing methods in the embodiments of this application.

It should be understood that the video picture processing apparatus 1000 shown in FIG. 15 may be understood as an apparatus including a video decoder. The decapsulation module 1001 in the apparatus corresponds to the video decoder, and can implement a corresponding function of the video decoder. The following briefly describes a structure of the video decoder with reference to FIG. 17.

Figure 17:
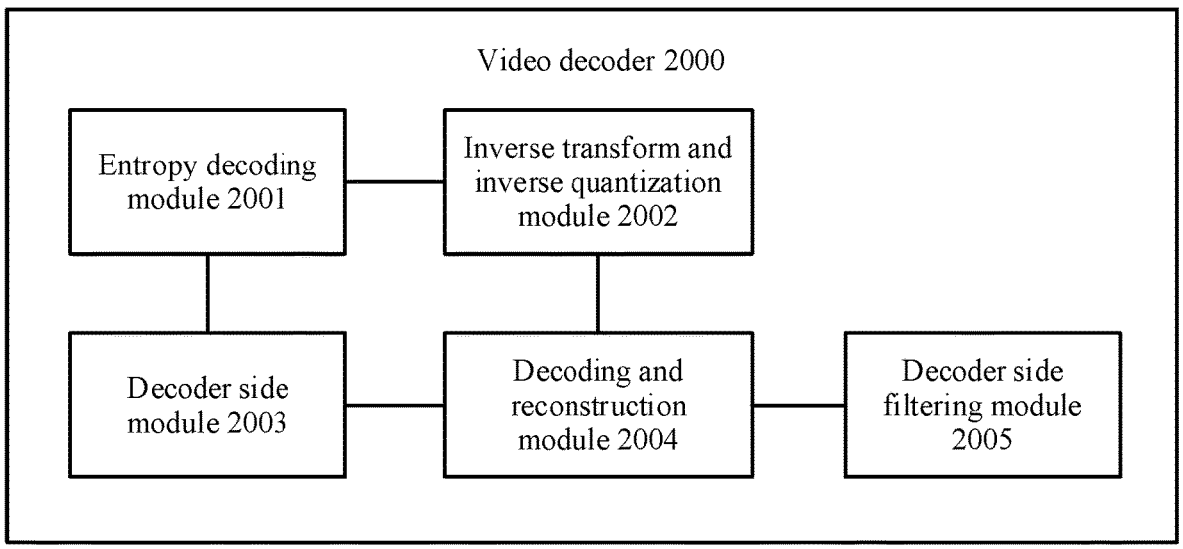
FIG. 17 is a schematic block diagram of a video decoder according to an embodiment of this application.

FIG. 17 is a schematic block diagram of a video decoder according to an embodiment of this application. The video decoder 2000 shown in FIG. 17 includes: an entropy decoding module 2001, an inverse transform and inverse quantization module 2002, a decoder side prediction module 2003, a decoding and reconstruction module 2004, and a decoder side filtering module 2005.

It should be understood that the video encoder 2000 shown in FIG. 17 may perform a process of decoding a video picture in the video picture processing methods in the embodiments of this application.

Figure 18:
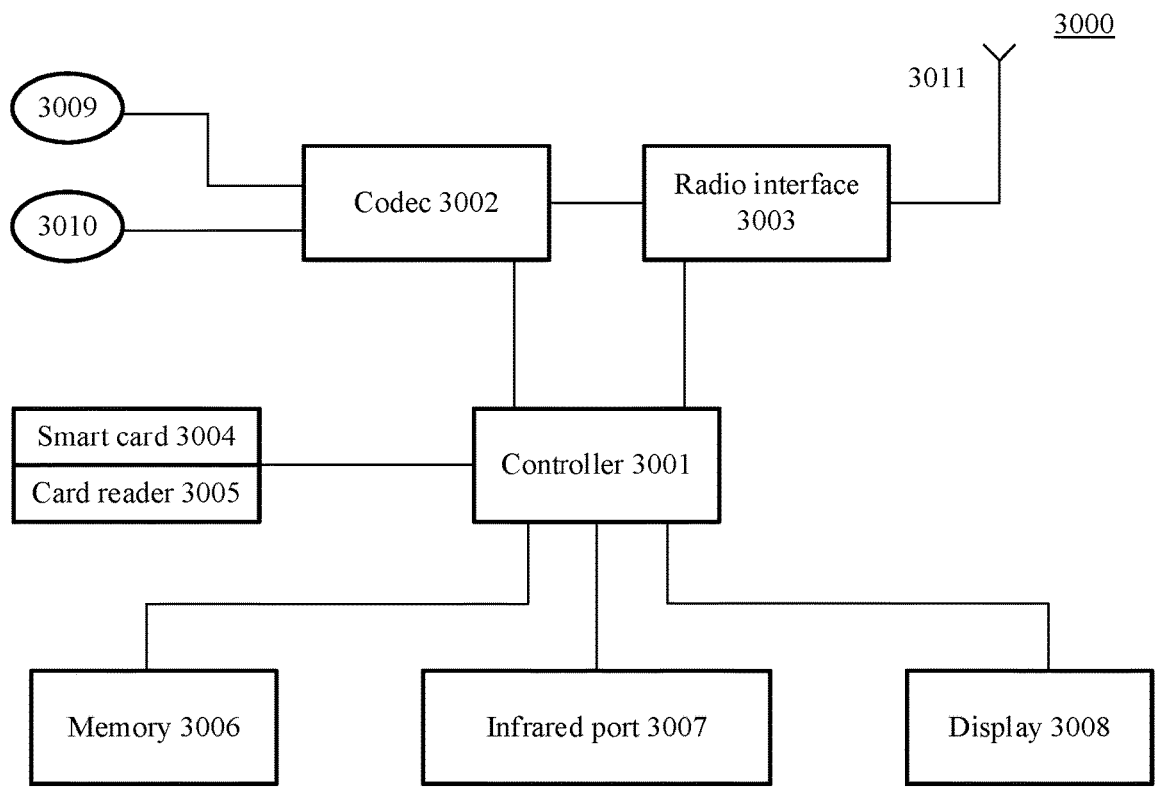
FIG. 18 is a schematic block diagram of a video encoding and decoding apparatus according to an embodiment of this application.
Figure 19:
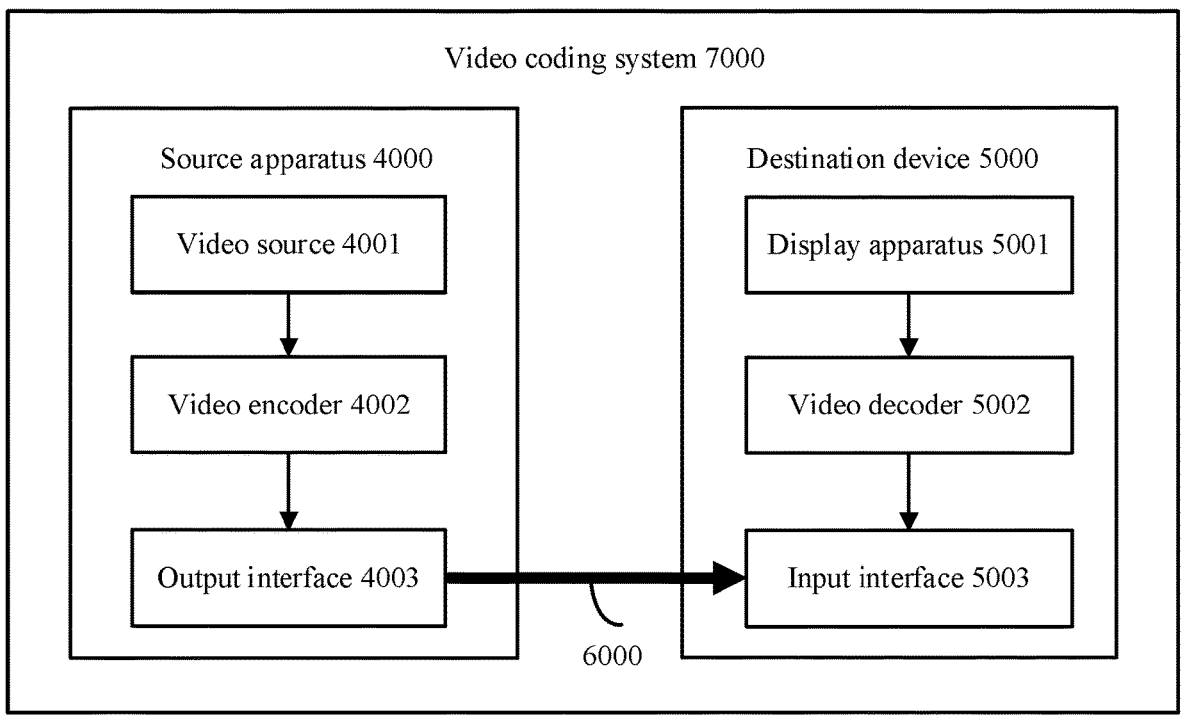
FIG. 19 is a schematic block diagram of a video encoding and decoding system according to an embodiment of this application.

The following describes in detail an encoding and decoding apparatus and an encoding and decoding system including the encoding and decoding system with reference to FIG. 18 and FIG. 19. It should be understood that the encoding and decoding apparatus and the encoding and decoding system shown in FIG. 18 and FIG. 19 can perform the video picture processing methods in the embodiments of this application.

FIG. 18 is a schematic block diagram of a video encoding and decoding apparatus according to an embodiment of this application. The video encoding and decoding apparatus 3000 may be an apparatus dedicated for encoding and/or decoding a video picture, or an electronic device having a video encoding and decoding function. Further, the video encoding and decoding apparatus 3000 may be a mobile terminal or user equipment of a wireless communications system.

The encoding and decoding apparatus 3000 may include the following modules or units: a controller 3001, a codec 3002, a radio interface 3003, an antenna 3011, a smart card 3004, a card reader 3005, a memory 3006, an infrared port 3007, and a display 3008.

In addition to the modules and the units shown in FIG. 18, the encoding and decoding apparatus 3000 may include a microphone or any appropriate audio input module. The audio input module may input a digital signal or an analog signal. The encoding and decoding apparatus 3000 may further include an audio output module. The audio output module may be an earphone, a speaker, or an analog audio output connection or a digital audio output connection. The encoding and decoding apparatus 3000 may further include a battery. The battery may be a solar cell, a fuel cell, or the like. The encoding and decoding apparatus 3000 may further include an infrared port configured to perform short-range line-of-sight communication with another device. The encoding and decoding apparatus 3000 may further communicate with the another device in any appropriate short-range communication mode, for example, a Bluetooth wireless connection or a USB/live line wired connection.

The memory 3006 may store data in a form of picture and data in a form of audio, and may also store an instruction to be executed on the controller 3001.

The codec 3002 may encode and decode audio data and/or video data or implement, under the control of the controller 3001, assisted encoding and assisted decoding on audio data and/or video data.

The smart card 3004 and the card reader 3005 may provide user information and may also provide authentication information of network authentication and an authorized user. Specific implementation forms of the smart card 3004 and the card reader 3005 may be an integrated circuit card (universal integrated circuit card, UICC) and a UICC reader.

The radio interface circuit 3003 may generate a wireless communication signal. The wireless communication signal may be a communication signal generated during communication in a cellular communications network, a wireless communications system, or a wireless local area network.

The antenna 3011 is configured to send, to another apparatus (there may be one or more apparatuses), a radio frequency signal that is generated on the radio interface circuit 3003, and may be further configured to receive a radio frequency signal from another apparatus (there may be one or more apparatuses).

In some embodiments of this application, the encoding and decoding apparatus 3000 may receive to-be-processed video picture data from another device before transmission and/or storage. In some other embodiments of this application, the encoding and decoding apparatus 3000 may receive a picture through a wireless or wired connection and encode/decode the received picture.

FIG. 19 is a schematic block diagram of a video encoding and decoding system 7000 according to an embodiment of this application.

As shown in FIG. 19, the video encoding and decoding system 7000 includes a source apparatus 4000 and a destination apparatus 5000. The source apparatus 4000 generates encoded video data. The source apparatus 4000 may alternatively be referred to as a video encoding apparatus or a video encoding device. The destination apparatus 5000 may decode the encoded video data generated by the source apparatus 4000. The destination apparatus 5000 may alternatively be referred to as a video decoding apparatus or a video decoding device.

Specific implementation forms of the source apparatus 4000 and the destination apparatus 5000 may be any one of the following devices: a desktop computer, a mobile computing apparatus, a notebook (for example, laptop) computer, a tablet computer, a set top box, a smartphone, a handset, a television, a camera, a display apparatus, a digital media player, a video game console, an in-vehicle computer, or other similar devices.

The destination apparatus 5000 may receive the encoded video data from the source apparatus 4000 by using a channel 6000. The channel 6000 may include one or more media and/or apparatuses that can move the encoded video data from the source apparatus 4000 to the destination apparatus 5000. In an example, the channel 6000 may include one or more communications media that can enable the source apparatus 4000 to directly transmit the encoded video data to the destination apparatus 5000 in real time. In this example, the source apparatus 4000 may modulate the encoded video data according to a communications standard (for example, a wireless communications protocol) and may transmit the modulated video data to the destination apparatus 5000. The one or more communications media may include wireless and/or wired communications media, for example, a radio frequency (RF) spectrum or one or more physical transmission lines. The one or more communications media may form a part of a packet-based network (for example, a local area network, a wide area network, or a global network (for example, the internet)). The one or more communications media may include a router, a switch, a base station, or another device implementing communication between the source apparatus 4000 and the destination apparatus 5000.

In another example, the channel 6000 may include a storage medium that stores the encoded video data generated by the source apparatus 4000. In this example, the destination apparatus 5000 may access the storage medium through disk access or card access. The storage medium may include a plurality of locally accessible data storage media such as a Blu-ray, a high-density digital video disc (DVD), a compact disc read-only memory (CD-ROM), or a flash memory, or another suitable digital storage medium configured to store the encoded video data.

In another example, the channel 6000 may include a file server or another intermediate storage apparatus that stores the encoded video data generated by the source apparatus 4000. In this example, the destination apparatus 5000 may access, through streaming transmission or downloading, the encoded video data stored in the file server or the another intermediate storage apparatus. The file server may be of a server type that can store the encoded video data and transmit the encoded video data to the destination apparatus 5000. For example, the file server may include a world wide web (Web) server (for example, used for a website), a file transfer protocol (FTP) server, a network attached storage (NAS) apparatus, and a local disk drive.

The destination apparatus 5000 may access the encoded video data through a standard data connection (for example, an internet connection). An example type of the data connection includes a radio channel that is suitable for accessing the encoded video data stored in the file server, a wired connection (for example, a cable modem), or a combination of the radio channel and the wired connection. The encoded video data may be transmitted from the file server through the streaming transmission, the downloading transmission, or a combination thereof.

The video picture processing methods in the embodiments of this application are not limited to a wireless application scenario. For example, the video picture processing methods in the embodiments of this application may be applied to video encoding and decoding supporting a plurality of multimedia applications such as the following applications: over-the-air television broadcasting, cable television transmission, satellite television transmission, streaming-transmission video transmission (for example, by using the internet), encoding of video data stored in a data storage medium, decoding of video data stored in a data storage medium, or another application. In some examples, the video encoding and decoding system 7000 may be configured to support unidirectional or bidirectional video transmission, so as to support applications such as video streaming transmission, video playing, video broadcasting, and/or videotelephony.

In FIG. 19, the source apparatus 4000 includes a video source 4001, a video encoder 4002, and an output interface 4003. In some examples, the output interface 4003 may include a modulator/demodulator (modem) and/or a transmitter. The video source 4001 may include a video capturing apparatus (for example, a video camera), a video archive including pre-captured video data, a video input interface configured to receive video data from a video content provider, and/or a computer graphics system configured to generate video data, or a combination of the foregoing video data sources.

The video encoder 4002 may encode video data from the video source 4001. In some examples, the source apparatus 4000 directly transmits encoded video data to the destination apparatus 5000 by using the output interface 4003. The encoded video data may be further stored in a storage medium or a file server, so that the destination apparatus 5000 accesses the encoded video data later for decoding and/or playing.

In the example in FIG. 19, the destination apparatus 5000 includes an input interface 5003, a video decoder 5002, and a display apparatus 5001. In some examples, the input interface 5003 includes a receiver and/or a modem. The input interface 5003 may receive the encoded video data by using the channel 6000. The display apparatus 5001 may be integrated with the destination apparatus 5000 or may be outside the destination apparatus 5000. Usually, the display apparatus 5001 displays decoded video data. The display apparatus 5001 may include a plurality of types of display apparatuses such as a liquid crystal display, a plasma display, an organic light-emitting diode display, or a display apparatus of another type.

The video encoder 4002 and the video decoder 5002 may operate according to a video compression standard (for example, a high efficiency video coding H.265 standard), and may comply with a high efficiency video coding (HEVC) test model (HM). Text description ITU-TH.265 (V3)(April 2015) of the H.265 standard is released on Apr. 29, 2015, and may be downloaded from http://handle.itu.int/11.1002/7000/12455. The file is incorporated in this specification by reference in its entirety.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a specific working process of the foregoing system, apparatus, and units, reference may be made to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve an objective of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit a protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A video picture processing method, comprising:
   sampling an initial picture, to obtain a target picture;
   dividing the target picture, to obtain a plurality of sub-pictures, wherein the plurality of sub-pictures comprise a first-category sub-picture and a second-category sub-picture, the first-category sub-picture is obtained by sampling a picture in a first region of the initial picture, the second-category sub-picture is obtained by sampling a picture in a second region of the initial picture, a sampling rate of the picture in the first region of the initial picture is lower than a sampling rate of the picture in the second region of the initial picture, and resolution of the first-category sub-picture is higher than resolution of the second-category sub-picture;
   extending picture borders of the first-category sub-picture, to obtain an extended first-category sub-picture;
   downsampling the extended first-category sub-picture, to obtain a downsampled first-category sub-picture, wherein resolution of the downsampled first-category sub-picture is the same as the resolution of the second-category sub-picture;
   encoding the second-category sub-picture and the downsampled first-category sub-picture, to obtain bitstreams; and
   writing location information and extension information of the plurality of sub-pictures into the bitstreams, wherein location information is used to indicate a location of a sub-picture in the target picture, extension information of the first-category sub-picture is used to indicate that the picture borders of the first-category sub-picture have been extended and indicate extension widths of the picture borders of the first-category sub-picture, and extension information of the second-category sub-picture is used to indicate that picture borders of the second-category sub-picture have not been extended.

2. The method according to claim 1, wherein the writing location information and extension information of the plurality of sub-pictures into the bitstreams comprises:
   encapsulating the location information and the extension information of each of the plurality of sub-pictures into a same box.

3. The method according to claim 1, wherein the initial picture is a panoramic video picture.

4. A video picture processing method, comprising:
   obtaining target bitstreams;
   parsing the target bitstreams, to obtain a plurality of sub-pictures and location information and extension information of the plurality of sub-pictures, wherein location information is used to indicate a location of a sub-picture in a to-be-displayed picture, extension information is used to indicate whether picture borders of a sub-picture have been extended, and when the extension information indicates that the picture borders of the sub-picture have been extended, the sub-picture belongs to a first-category sub-picture, and the extension information is further used to indicate extension widths of the picture borders of the sub-picture, or when the extension information indicates that the picture borders of the sub-picture have not been extended, the sub-picture belongs to a second-category sub-picture;
   determining the first-category sub-picture and the second-category sub-picture from the plurality of sub-pictures based on the extension information of the plurality of sub-pictures;
   determining target resolution based on the location information and the extension information of the first-category sub-picture;
   upsampling the first-category sub-picture based on the target resolution, to obtain an upsampled first-category sub-picture, wherein resolution of the upsampled first-category sub-picture is the target resolution;
   splicing the upsampled first-category sub-picture and the second-category sub-picture based on the location information of the plurality of sub-pictures;
   performing weighted processing on values of pixels in an overlapping region between upsampled first-category sub-pictures, to obtain weighted first-category sub-pictures; and
   filtering a border region between adjacent second-category sub-pictures and a border region between a weighted first-category sub-picture and a second-category sub-picture, to obtain the to-be-displayed picture, wherein the border region comprises regions of preset sizes on two sides of a boundary between two sub-pictures.

5. The method according to claim 4, wherein the determining target resolution based on the location information and the extension information of the first-category sub-picture comprises:
   determining a width and a height of the first-category sub-picture based on the location information of the first-category sub-picture;
   determining, based on the extension information of the first-category sub-picture, extension widths of picture borders of the first-category sub-picture; and
   determining the target resolution based on the width and the height of the first-category sub-picture and the extension widths of the picture borders of the first-category sub-picture.

6. The method according to claim 4, wherein the location information and the extension information of each of the plurality of sub-pictures are encapsulated into a same box.

7. The method according to claim 4, wherein the location information and the extension information of the plurality of sub-pictures are encapsulated into supplemental enhancement information (SEI) or a media presentation description (MPD).

8. The method according to claim 4, wherein the overlapping region between the upsampled first-category sub-pictures comprises an overlapping region between a first sub-picture and a second sub-picture, a picture that is in the overlapping region and that is of the first sub-picture is an extended picture, and a picture that is in the overlapping region and that is of the second sub-picture is an overlapping picture; and the performing weighted processing on values of pixels in an overlapping region between upsampled first-category sub-pictures comprises:

performing weighted processing on values of pixels that are in the extended picture and the overlapping picture and that are at a same location in the overlapping region, wherein a pixel that is in the overlapping picture and that is closer to a center location of the first sub-picture has a greater weighting coefficient, and a pixel that is in the extended picture and that is closer to the center location of the first sub-picture has a smaller weighting coefficient.

9. The method according to claim 4, wherein the filtering the border region between adjacent second-category sub-pictures and the border region between the weighted first-category sub-picture and the second-category sub-picture, to obtain the to-be-displayed picture comprises:

determining pixel value gradients of pictures in the border region; and when a pixel value gradient of a picture in the border region is less than a preset gradient, performing filtering processing on the picture in the border region; or when a pixel value gradient of a picture in the border region is greater than or equal to the preset gradient, omitting filtering processing on the picture in the border region.

10. The method according to claim 9, wherein the border region comprises a first region and a second region, the first region and the second region are separately located on two sides of a boundary, and the performing filtering processing on the picture in the border region comprises:

determining a texture strength of the border region;

performing filtering processing on the border region by using a first filtering strength, when the texture strength of the border region is greater than or equal to a first preset strength; or determining a texture strength of a target region when the texture strength of the border region is less than the first preset strength, wherein the target region is the first region or the second region; and filtering a picture in the target region by using the first filtering strength, when the texture strength of the target region is greater than or equal to a second preset strength; or filtering the picture in the target region by using a second filtering strength, when the texture strength of the target region is less than the second preset strength.

11. The method according to claim 10, wherein an effect range of the first filtering strength is less than an effect range of the second filtering strength.

12. A video picture processing apparatus, comprising:
a non-transitory memory having processor-executable instructions stored thereon; and
a processor, coupled to the memory, configured to execute the processor-executable instructions to:
sample an initial picture, to obtain a target picture;
divide the target picture, to obtain a plurality of sub-pictures, wherein the plurality of sub-pictures comprise a first-category sub-picture and a second-category sub-picture, the first-category sub-picture is obtained by sampling a picture in a first region of the initial picture, the second-category sub-picture is obtained by sampling a picture in a second region of the initial picture, a sampling rate of the picture in the first region of the initial picture is lower than a sampling rate of the picture in the second region of the initial picture, and resolution of the first-category sub-picture is higher than resolution of the second-category sub-picture;
extend picture borders of the first-category sub-picture, to obtain an extended first-category sub-picture;
downsample the extended first-category sub-picture, to obtain a downsampled first-category sub-picture, wherein resolution of the downsampled first-category sub-picture is the same as the resolution of the second-category sub-picture;
encode the second-category sub-picture and the downsampled first-category sub-picture, to obtain bitstreams; and
write location information and extension information of the plurality of sub-pictures into the bitstreams, wherein location information is used to indicate a location of a sub-picture in the target picture, extension information of the first-category sub-picture is used to indicate that the picture borders of the first-category sub-picture have been extended and indicate extension widths of the picture borders of the first-category sub-picture, and extension information of the second-category sub-picture is used to indicate that picture borders of the second-category sub-picture have not been extended.

13. The apparatus according to claim 12, wherein the processor is configured to execute the processor-executable instructions to encapsulate the location information and the extension information of each of the plurality of sub-pictures into a same box.

14. The apparatus according to claim 12, wherein the initial picture is a planar picture obtained by mapping a panoramic video picture.

* * * * *